(12) United States Patent
Shimizu

(10) Patent No.: US 6,491,475 B1
(45) Date of Patent: Dec. 10, 2002

(54) CABLE BED SYSTEM UTILIZING DRAG ROUTE FORMERS AND LAYER DEVICE, AND CABLE LAYING METHOD USING SAME

(75) Inventor: Shohachi Shimizu, Anpahi-gun (JP)

(73) Assignee: Mirai Kogyo Kabushiki Kaisha, Gifu (JP)

( * ) Notice: Subject to any disclaimer, the term of this patent is extended or adjusted under 35 U.S.C. 154(b) by 0 days.

(21) Appl. No.: 09/380,031

(22) PCT Filed: Dec. 24, 1998

(86) PCT No.: PCT/JP98/05922

§ 371 (c)(1),
(2), (4) Date: Nov. 23, 1999

(87) PCT Pub. No.: WO99/34491

PCT Pub. Date: Aug. 7, 1999

(30) Foreign Application Priority Data

Dec. 26, 1997 (JP) .............................................. 9-361399

(51) Int. Cl.[7] .................................................. H02G 1/06
(52) U.S. Cl. ............... 405/184; 198/468.01; 414/745.1; 414/745.4; 414/745.7; 414/746.7; 254/134.3 R
(58) Field of Search .................................. 405/158, 164, 405/165, 168.3, 168.4, 177, 178, 183, 184, 154.1; 254/29 R, 134.3 R, 226; 198/468.01; 414/745.4, 745.7, 746.7, 745.1

(56) References Cited

U.S. PATENT DOCUMENTS

| 753,293 | A | * | 3/1904 | McMurtry ................ 198/468.1 |
| 1,423,856 | A | * | 7/1922 | Jupp et al. ............... 198/468.1 |
| 3,690,472 | A | * | 9/1972 | Poore et al. ............. 414/745.7 |
| 4,257,718 | A | * | 3/1981 | Rosa et al. .................. 405/167 |
| 4,521,132 | A | * | 6/1985 | Isakson et al. .............. 405/165 |
| 4,881,634 | A | * | 11/1989 | Stolzer ..................... 414/745.7 |
| 5,011,333 | A | * | 4/1991 | Lanan ...................... 405/168.3 |
| 5,527,134 | A | * | 6/1996 | Recalde ................... 405/168.3 |
| 5,533,834 | A | * | 7/1996 | Recalde ................... 405/168.3 |
| 5,580,187 | A | * | 12/1996 | Jordan ..................... 405/168.3 |
| 5,649,722 | A | * | 7/1997 | Champlin ................... 280/818 |
| 5,660,410 | A | * | 8/1997 | Alden ........................ 280/627 |
| 6,129,486 | A | * | 10/2000 | Putnam ...................... 405/184 |

FOREIGN PATENT DOCUMENTS

| GB | -2224803 A | * | 5/1990 | ............. F16L/1/04 |
| JP | 03-239107 A | * | 10/1991 | ............. H02G/1/06 |
| JP | 08-208114 A | * | 10/1996 | ............. H02F/1/06 |

* cited by examiner

Primary Examiner—Thomas B. Will
Assistant Examiner—Alexandra K. Pechhold
(74) Attorney, Agent, or Firm—Dorsey & Whitney LLP

(57) ABSTRACT

A cable laying method is disclosed, which facilitates an easy cable laying on a cable bed without damaging cables. The method comprises dragging a cable onto a cable drag route of a cable bed, and shifting the cable onto a cable housing provided adjacent the drag route.

21 Claims, 41 Drawing Sheets

CABLE BED SYSTEM UTILIZING DRAG ROUTE FORMERS AND LAYER DEVICE, AND CABLE LAYING METHOD USING SAME

BACKGROUND OF THE INVENTION

1. Field of the Invention

This invention relates to a method for laying cables or pipes on a cable bed. This invention also relates to a cable bed system utilizing drag route formers and layer device.

2. Background Art

Cable beds such as cable racks or cable ducts for laying and holding electrical cables or pipes, generally under or over a ceiling, are utilized at a variety of locations such as in buildings or warehouses. It is noted that throughout the specification and claims, the term "cable bed" includes cable receiver, rack, ladder, duct, tray, etc. that hold electrical cables/pipes thereon. It is also noted that throughout the specification and claims, the term "cable" includes flexible pipe.

Japanese Patent Laid-Open Publication No. 8-280116 discloses such a cable laying system.

Conventionally, cables laid on a cable bed will hinder subsequent cable laying operations due mainly to considerable friction caused with lying cables. Subsequent cable laying operations may dislocate lying cables inadvertently. In addition, friction or entanglement between lying cables and a cable being newly laid may be damaging to the cables.

Accordingly, it is an object of the present invention to provide an improved cable laying method and an improved cable bed system.

FUNDAMENTAL FEATURES OF THE INVENTION

A cable laying method according to the present invention comprises the steps of first dragging an electrical cable onto a cable drag route of a cable bed and shifting the cable laid through the cable drag route by simply lifting and moving the cable sideways onto a cable housing adjacently provided. According to the method of the present invention, there is caused practically no drag friction or entanglement between cables. Thus, overhead cable laying operation can be performed very easily without damaging cables.

BEST MODE FOR CARRYING OUT THE INVENTION

Figure 1:
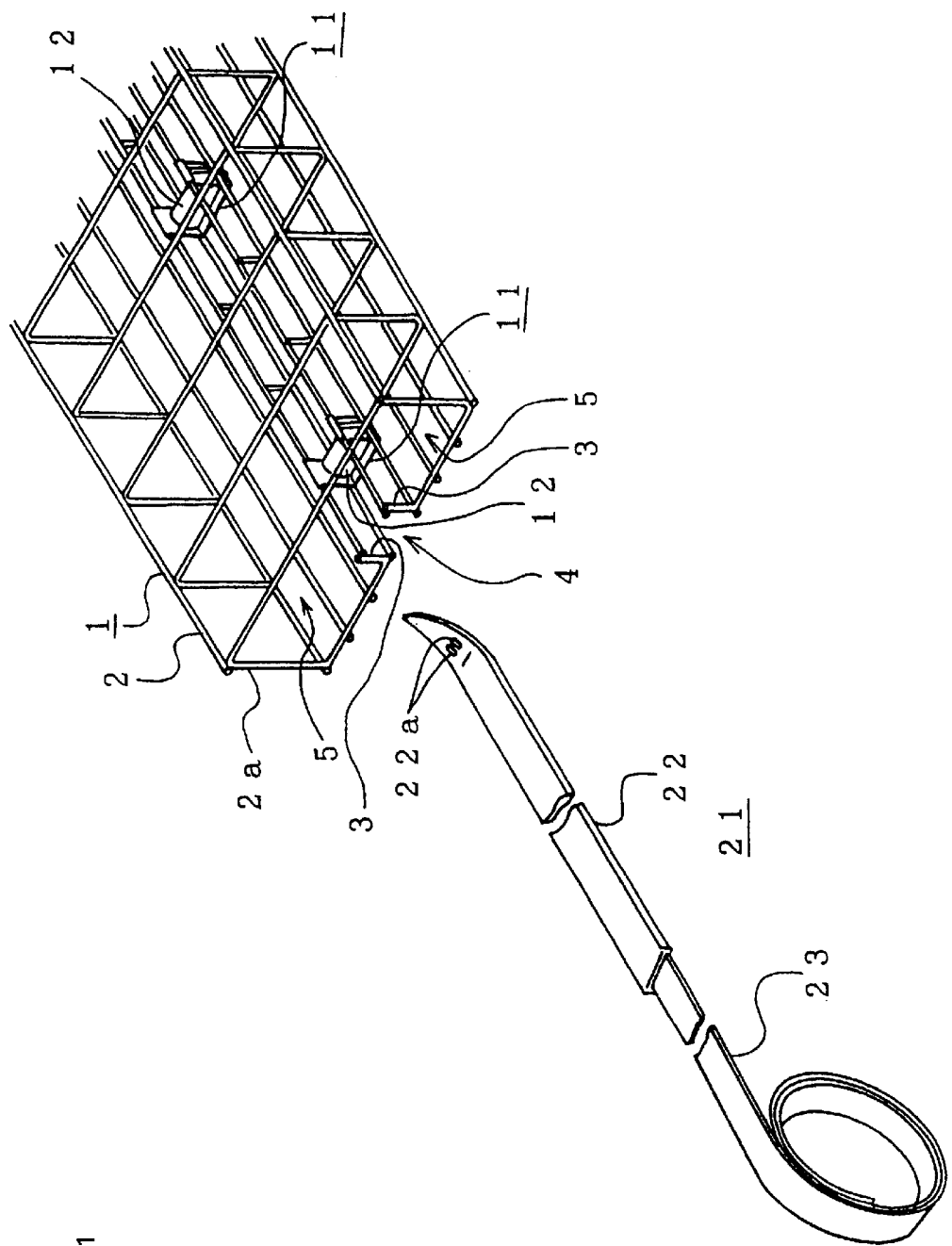
FIG. 1 is a perspective view of a cage-type cable bed having a cable drag route and a pair of cable housings, also showing a layer device placed separately, all prepared according to an embodiment of the present invention.
Figure 45:
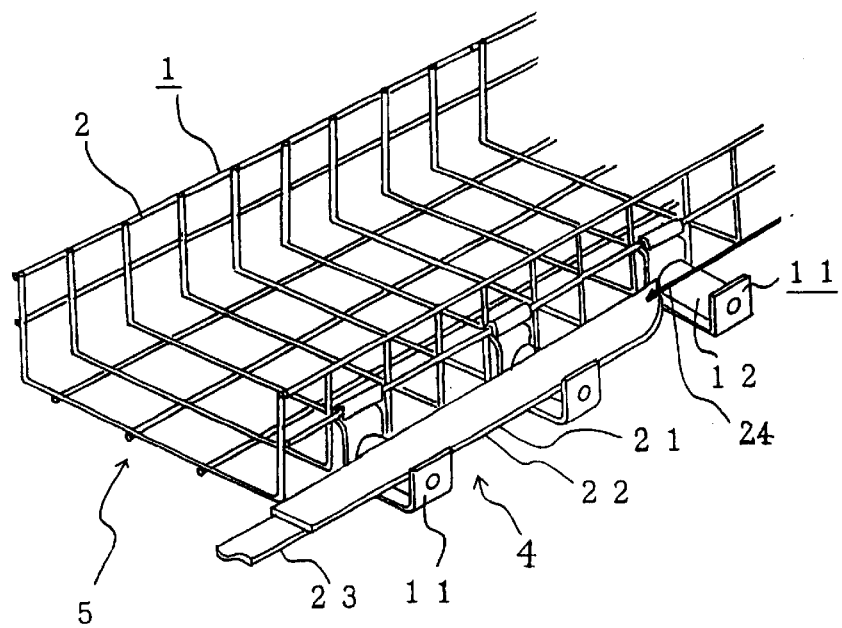
FIG. 45 is a perspective view showing a tray-type cable bed having a cable drag route outside its bed body formed with drag route formers according to another embodiment of the present invention.

There are a variety of electrical cable beds. There are cage-type cable beds such as shown in FIG. 1, tray-type cable beds such as shown in FIG. 45, solid-type cable beds, and other types of cable beds as depicted throughout the drawings. The present invention can be utilized practically for any type of cable bed.

Figure 2:
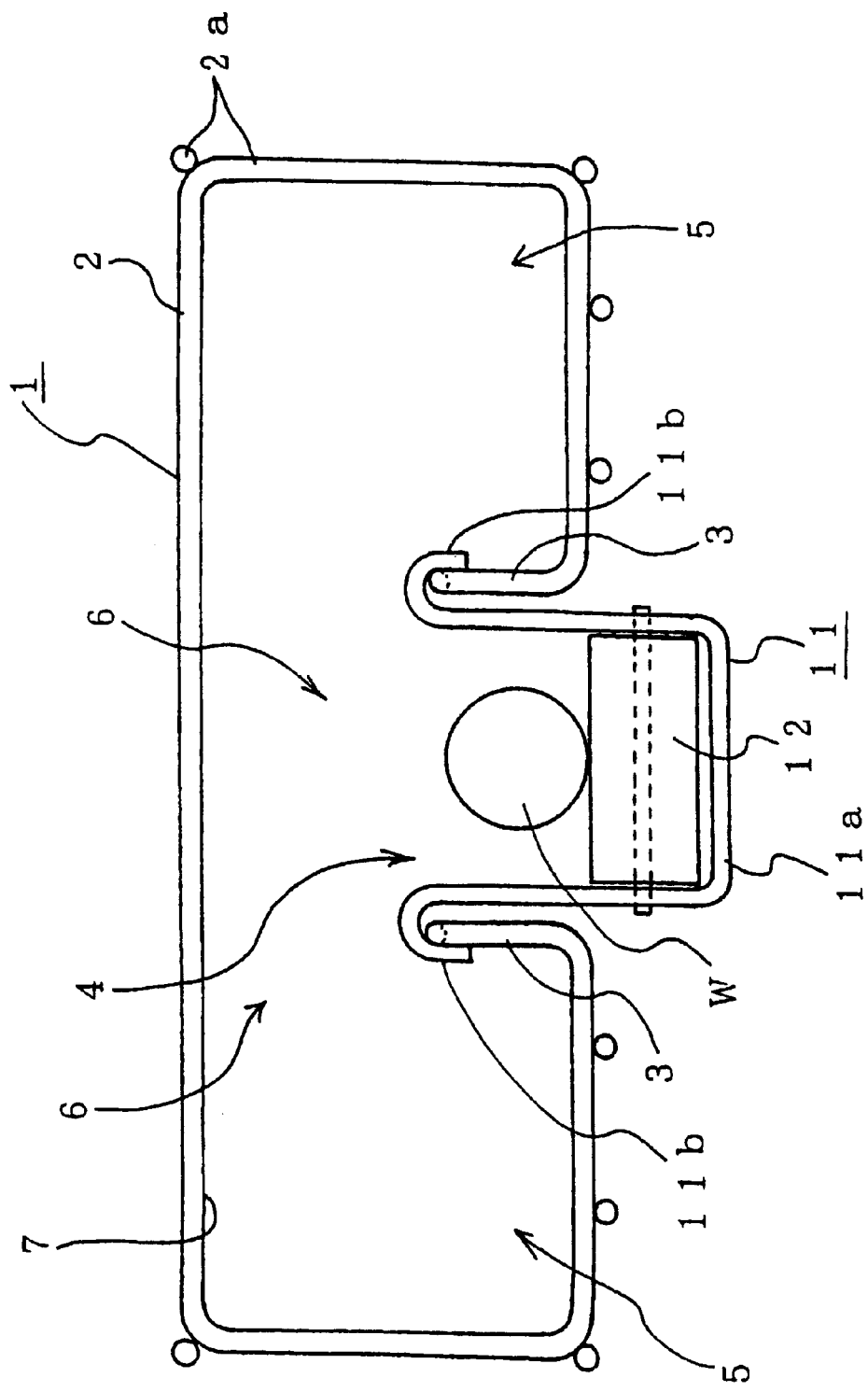
FIG. 2 is a front view of the cable bed of FIG. 1 where a cable lies on the cable drag route.
Figure 3:
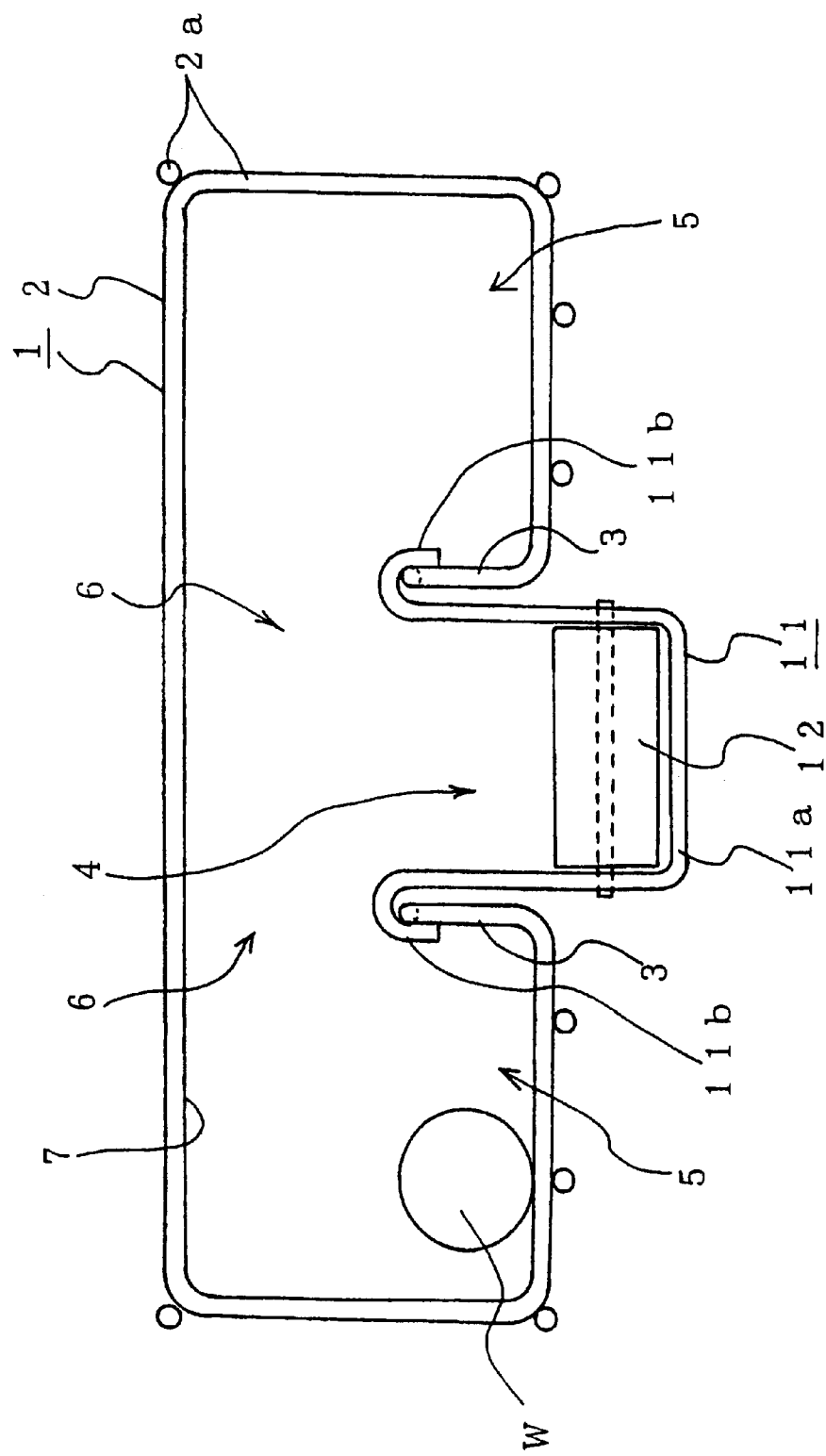
FIG. 3 is a front view of the cable bed, after the cable is shifted onto one of the cable housings.

In FIG. 1 is shown a cable bed 1 according to an embodiment of the present invention, comprising a cable bed body 2 consisting of a plurality of wires 2a bent and welded into a mesh-type or cage-type bed body 2. As shown in FIG. 2, the bed body 2 is provided with an axial opening along the center of its bottom between a pair of vertically provided longitudinal route walls 3. The axial opening provides a cable drag route 4 formed with a plurality of drag route formers 11 arranged at intervals along the drag route 4. On each side of the drag route 4 is provided a longitudinally extending cable housing 5. Above the drag route 4 is provided a longitudinally extending shifting space 6 utilized to shift a cable laid on the drag route 4 sideways onto one of the cable housings 5 as shown in FIG. 3.

Figure 4:
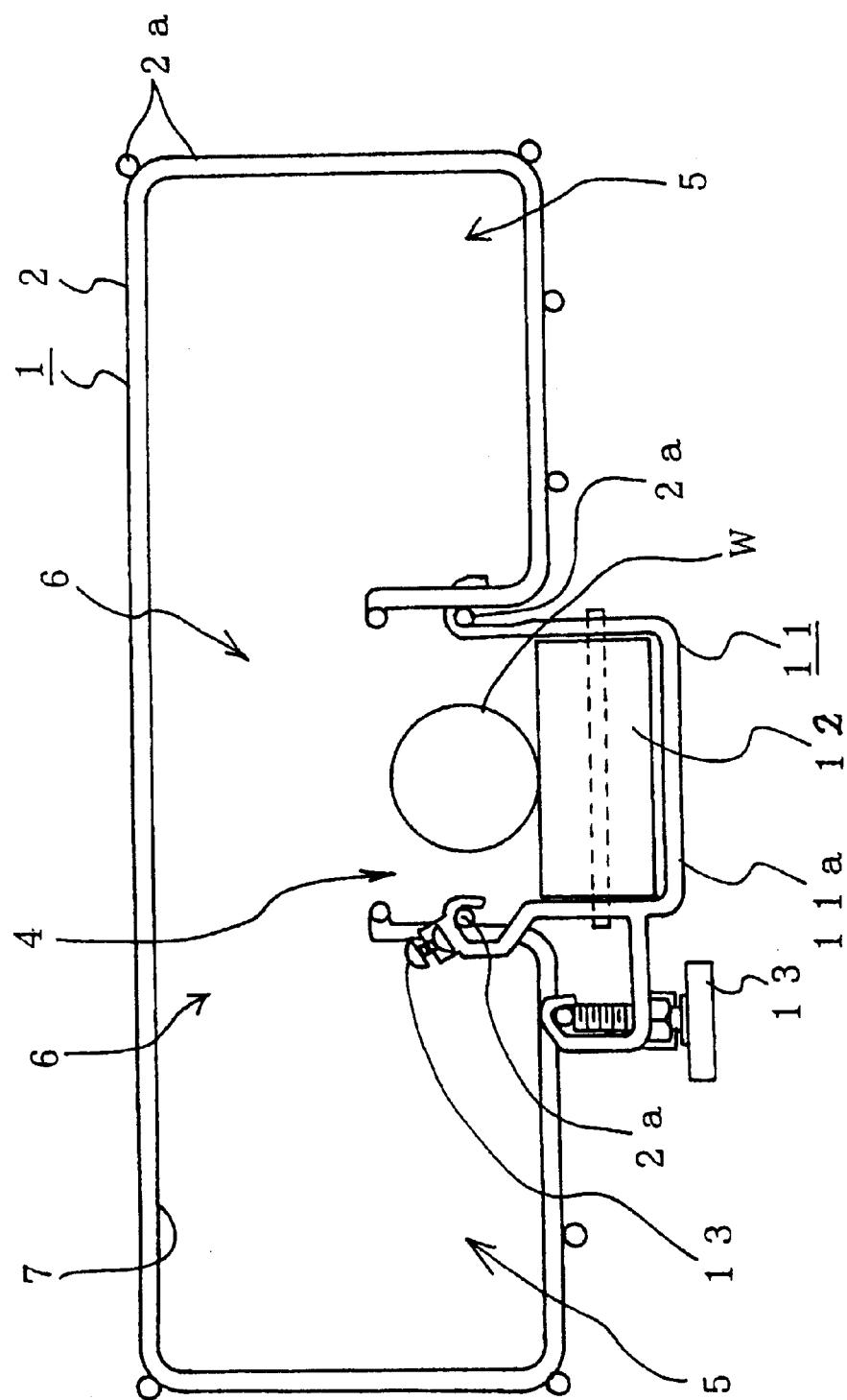
FIG. 4 is a front view of the cable bed of FIG. 1, where a plurality of drag route formers according to the present invention are incorporated.

The drag route former 11 comprises a support plate 11a which is bent at two places to provide walls each having a hook 11b along its upper edge as shown in FIG. 2. The drag route former 11 further comprises a roll device 12 having a roll which rotates in the cable lying directions. The drag route former 11 is hung from the route walls 3 with the hooks 11b which engage the route walls 3. The hooks 11b may alternatively be hooked as shown in FIG. 4 utilizing securing means 13 so that the drag route former 11 can be held stable. The roll devices 12 assist in dragging a cable W onto the drag route 4 as well as prevent damaging to the cable W during cable dragging operation.

A layer device such as the one 21 shown in FIG. 1 is generally used to lay a drag string, rope or wire on the cable drag route 4 so that a cable can be connected to the drag string, rope or wire. Alternatively, the layer device may be used to directly lay a cable on the drag route 4. The layer device 21 comprises a head portion 22 and an elongated semi-rigid/flexible tail 23. The tail 23 should be long and rigid enough to send the head portion 22 with hands through the drag route 4 by pushing. The head portion 22 is formed with a ski-like plate material, which is advantageously made longer than 2L's (FIG. 6) to span at least three drag route formers 11 so as to be stably held on the drag route formers 11 and not to fall between the drag route formers 11. The foremost portion of the head portion 22 is advantageously bent as shown in FIG. 1 so as to smoothly clear the drag route formers 11 when travelling. The head portion 22 is provided with connection holes 22a to be utilized to tie a rope or string therewith. The tail 23 may be replaced with a semi-rigid wire.

Figure 5:
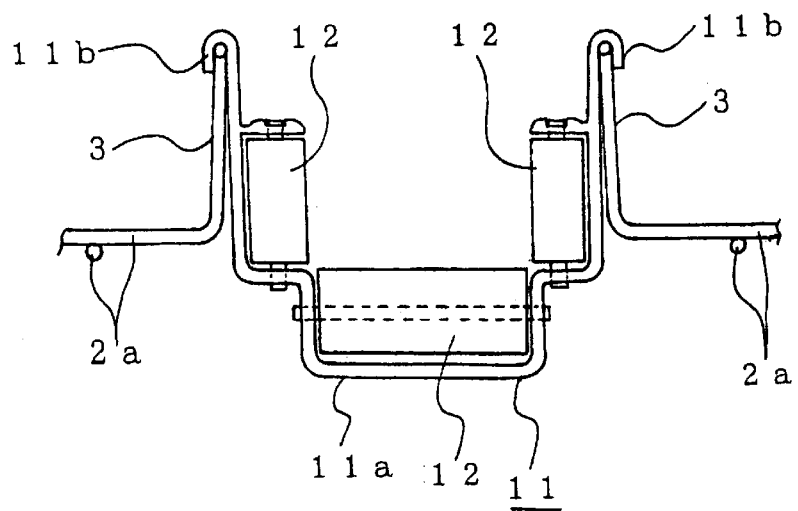
FIG. 5 is a front view of the cable bed of FIG. 1, where a plurality of another type of drag route formers are incorporated.

In order to further assist in drawing a cable W onto the drag route 4, additional roll device 12 may be provided internally on the walls of the support plate 11a as shown in FIG. 5 so that the rolls of the additional roll devices 12 can reduce friction between a cable W and the walls.

A method according to the present invention for laying a cable W on the cable bed 1 using the layer device 21 is described using FIGS. 6–9.

Figure 6:
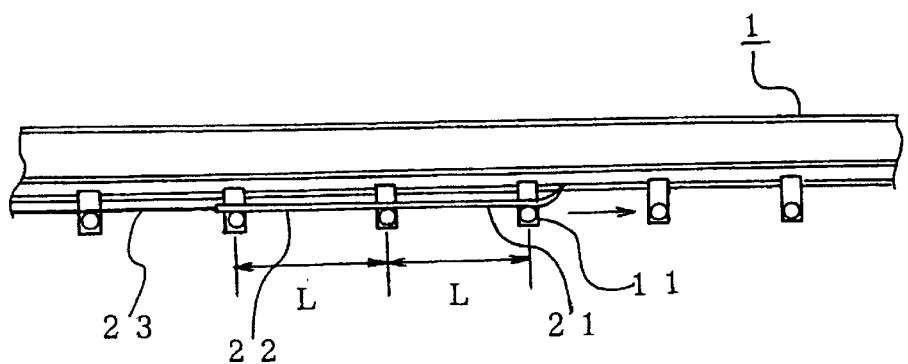
FIG. 6 is a side elevational view of a cable bed, schematically showing a cable dragging process using the layer device shown in FIG. 1.
Figure 7:
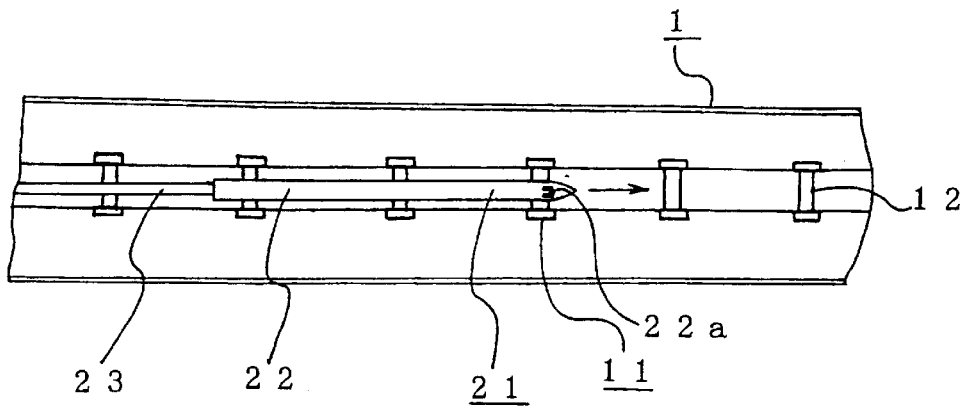
FIG. 7 is a plan view schematically showing the cable dragging process shown in FIG. 6, using the layer device shown in FIG. 1.
Figure 8:
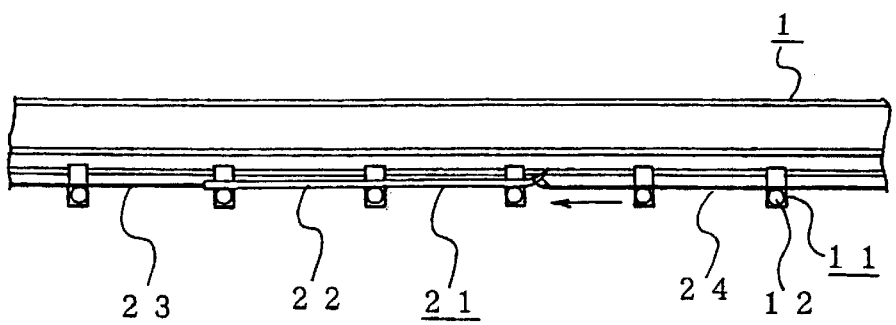
FIG. 8 is a side elevational view schematically showing another cable dragging process using the layer device shown in FIG. 1.
Figure 9:
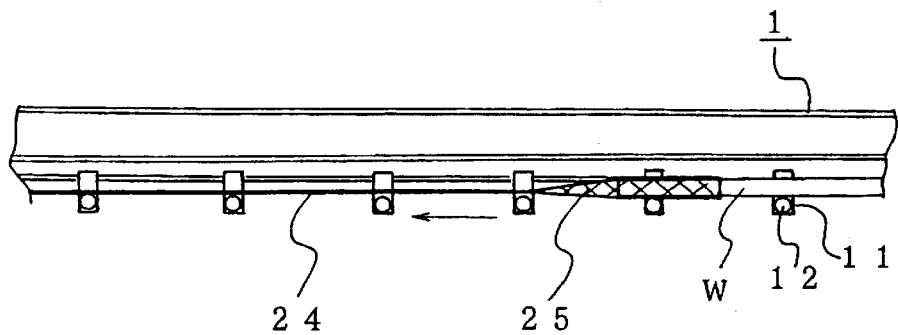
FIG. 9 is a side elevational view schematically showing another cable dragging process using the layer device shown in FIG. 1.

As shown in FIGS. 6 and 7, the head portion 22 of the layer device 21 is first placed on a drag route former 11 in the cable drag route 4. The tail 23 is pushed by hand and sent forward gradually until the head portion 22 reaches a desired portion of the cable bed 1. A drag rope 24 is then tied to the rope holes 22a. The layer device 21 is pulled back by the tail 23 together with the drag rope 24 so that the drag rope 24 is laid through the cable drag route 4. At either end of the drag route 4, the drag rope 24 is tied to a cable W which is conveniently capped with a net-like cable holder 25. The drag rope 24 is then pulled on the drag route 4 from the other end as shown in FIG. 9 so that the cable W is dragged and laid on the drag route formers 11 arranged in the drag route 4.

It is possible to eliminate the cable holder 25. The cable W may be directly tied to the layer device 21 and laid through the drag route 4 as the layer device 21 is pulled back. It is also possible to tie the drag rope 24 to the rope holes 22a before the layer device 21 is sent through the drag route 4. The drag rope 24 can be laid through the drag route 4 as the layer device 21 is laid on the drag route 4.

After the cable W is laid through the drag route 4, the cable W is shifted sideways onto a cable housing 5 through the shifting space 6.

The cable W can be drawn onto the drag route 4 from any opening provided between each pair of drag route formers 11. The roll device 12 of the involved drag route former 11 will adequately assist drawing of the cable W onto the drag route 4 without damage.

FIGS. 10–16 show a cable shifting device or shifter 14 used to shift a cable W lying on the drag route 4 onto an adjacent cable housing 5.

Figure 10:
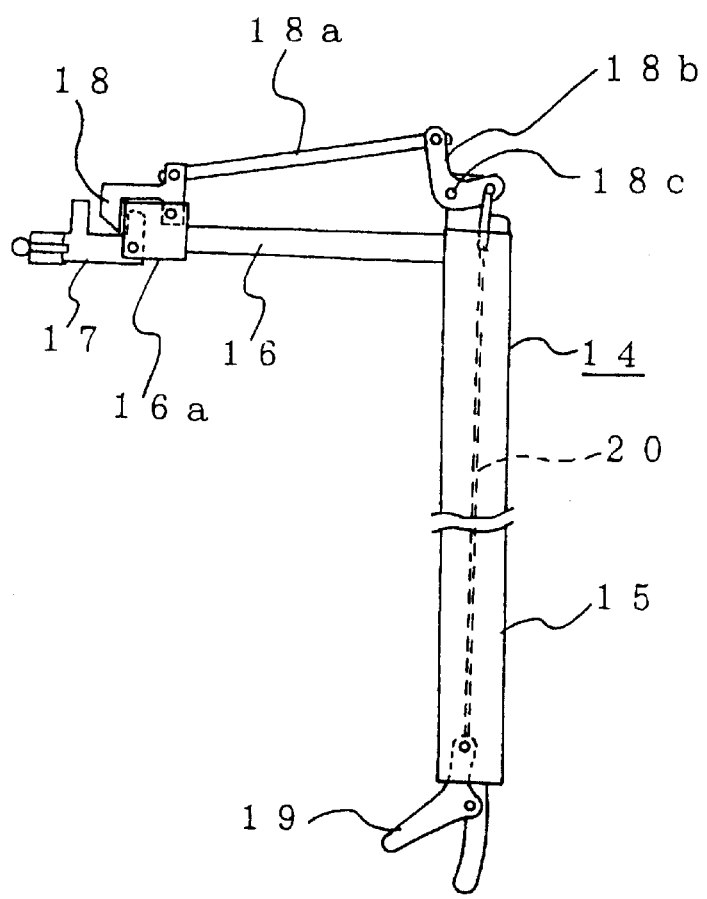
FIG. 10 schematically shows a cable shifter of the present invention to be used to shift a cable from the cable drag route onto a cable housing.
Figure 11:
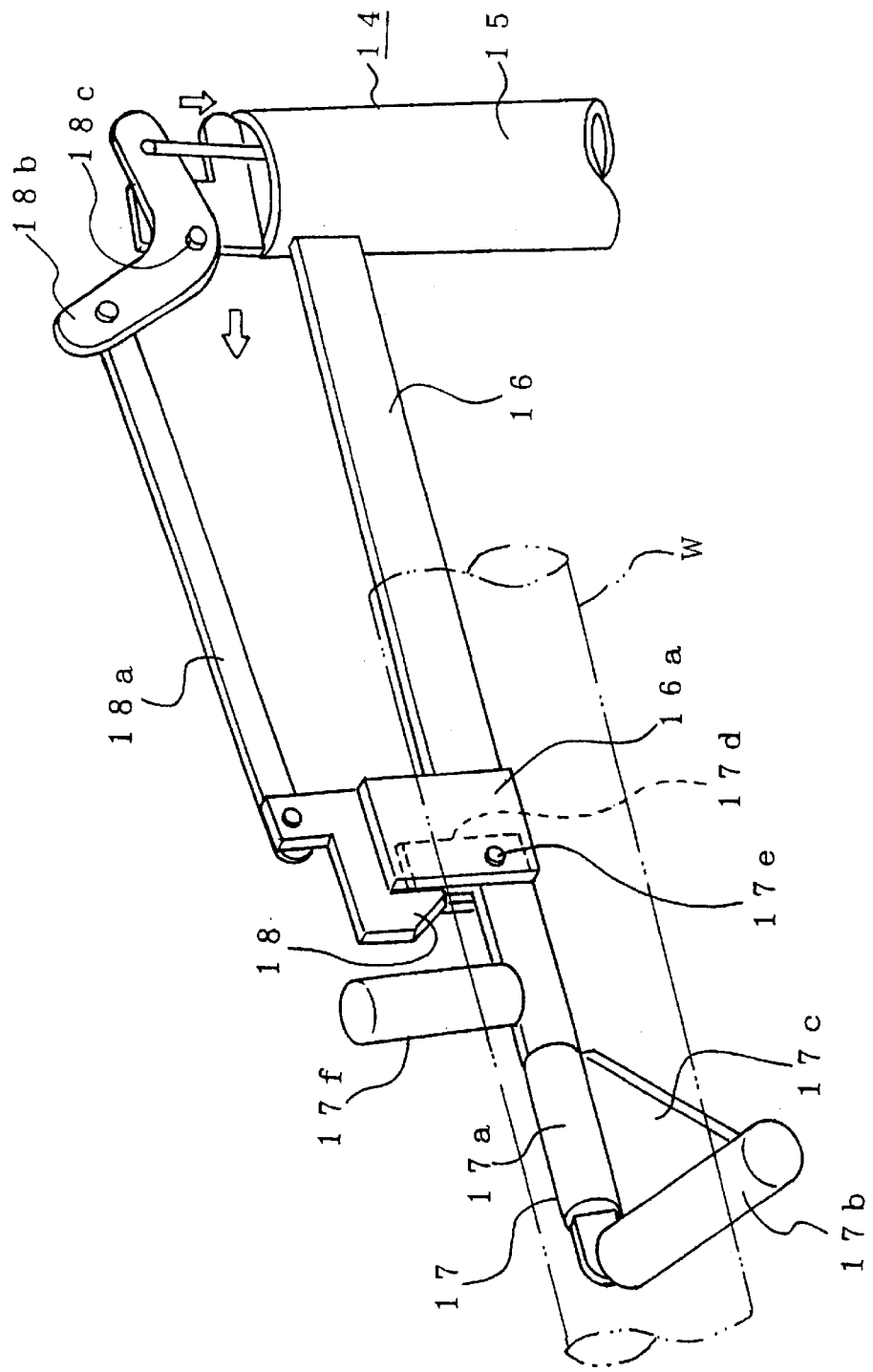
FIG. 11 is an enlarged view, partially showing detail of a portion of the cable shifter of FIG. 10.
Figure 12:
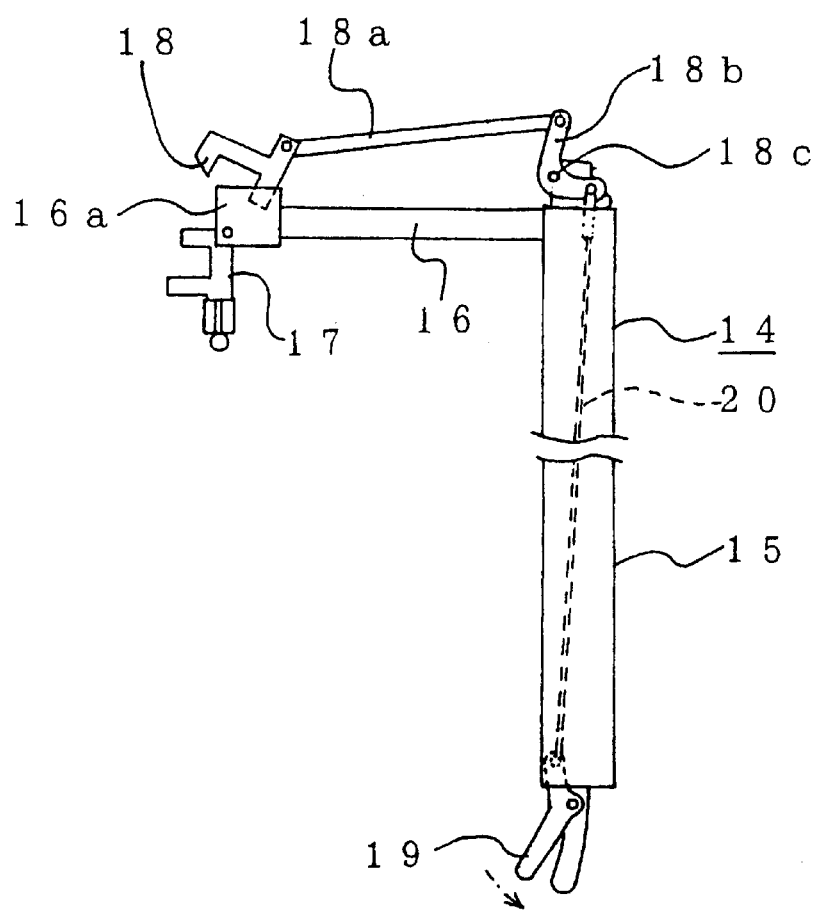
FIG. 12 shows an operation stage of the cable shifter of FIG. 10.

In FIG. 10, a cable shifter 14 is shown, comprising a pole 15, an arm 16 extending outwardly at a right angle from an end of the pole 15, a pair of base plates 16a provided on an outer end of the arm 16, and a cable holder 17 provided on an outer edge of the base plates 16a. As clearly shown in FIG. 11, the cable holder 17, which can pivot vertically as shown in FIG. 12, comprises a columnar portions 17a and 17b and a triangular plate 17c. The columnar portions 17a and 17b are provided at right angles. A cable W is held on the columnar portion 17a or 17b and the triangular plate 17c. It is preferred that the columnar portions 17a and 17b are covered with a resin material to prevent damage onto the cable W during a cable shifting operation. A pin member 17f is provided adjacent the columnar portion 17a to retain the cable W when the cable shifter 14 changes its horizontal orientation.

Figure 13:
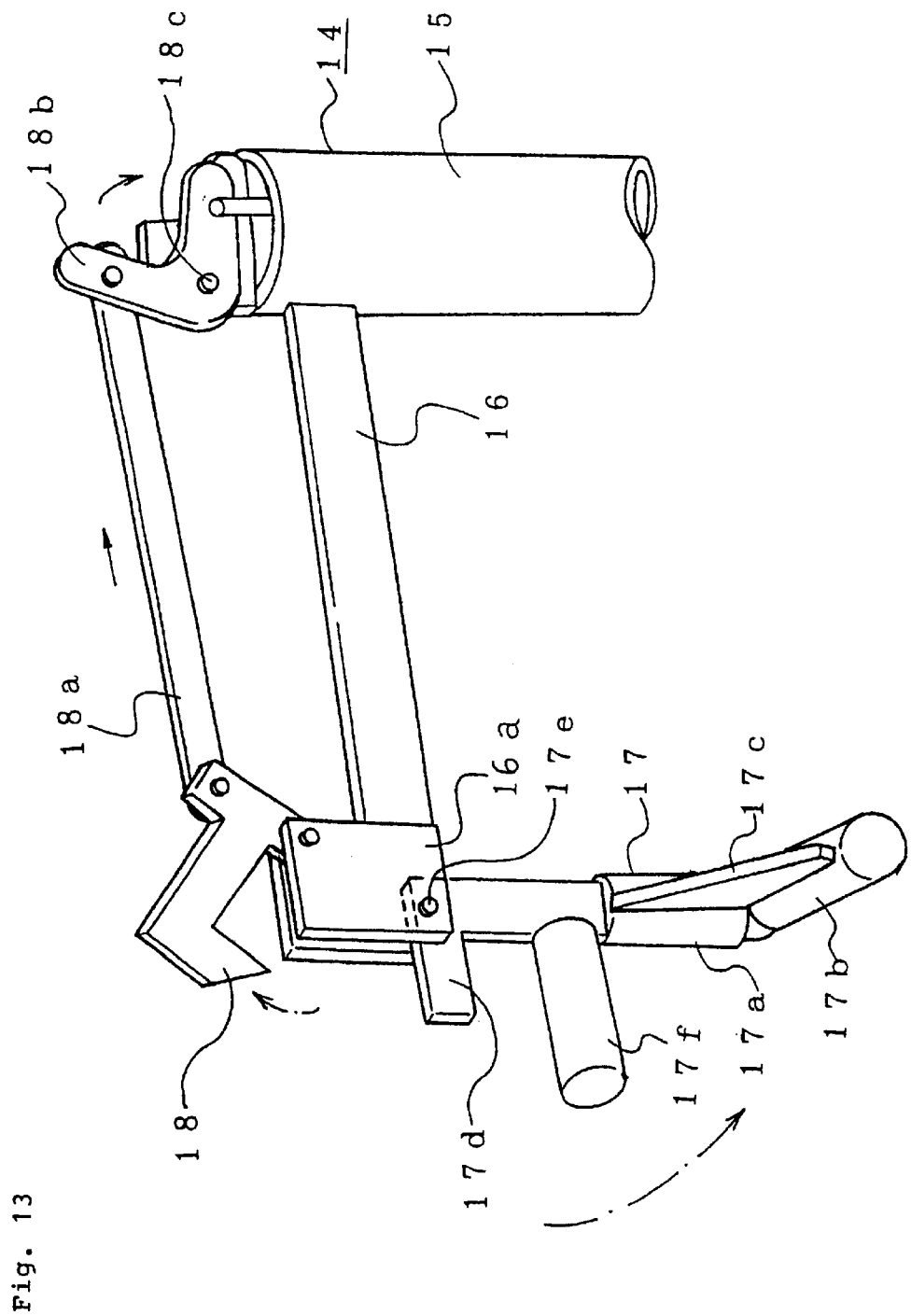
FIG. 13 is an enlarged view, partially showing detail of the operation stage of the cable shifter shown in FIG. 12.

The cable holder 17 is connected to a ratchet plate 17d which is locked by a ratchet 18 so as to horizontally extend from the base plates 16a. As shown in FIGS. 12 and 13, the ratchet plate 17d and the cable holder 17 pivot downward between the base plates 16a around the pivot shaft 17e when the ratchet plate 17d is unlocked and released from the ratchet 18.

The ratchet 18 is operated with a hand (not shown) at the lower end of the pole 15 through a bar 18a, boomerang-like member 18b provided on the upper end of the pole 15, wire 20 and a handle grip 19. The boomerang-like member 18b pivots on a pivot pin 18c.

When the handle grip 19 is squeezed with a hand (not shown), the wire 20 is pulled downward, which pivots the boomerang-like member 18b on the pivot pin 18c so as to pull the bar 18a (to the right in the drawings). The ratchet 18 then unlocks the ratchet plate 17d so that the cable holder 17 hangs down on the pivot shaft 17e. The cable W held on the cable holder 17 is dropped onto a cable housing 5.

Figure 14:
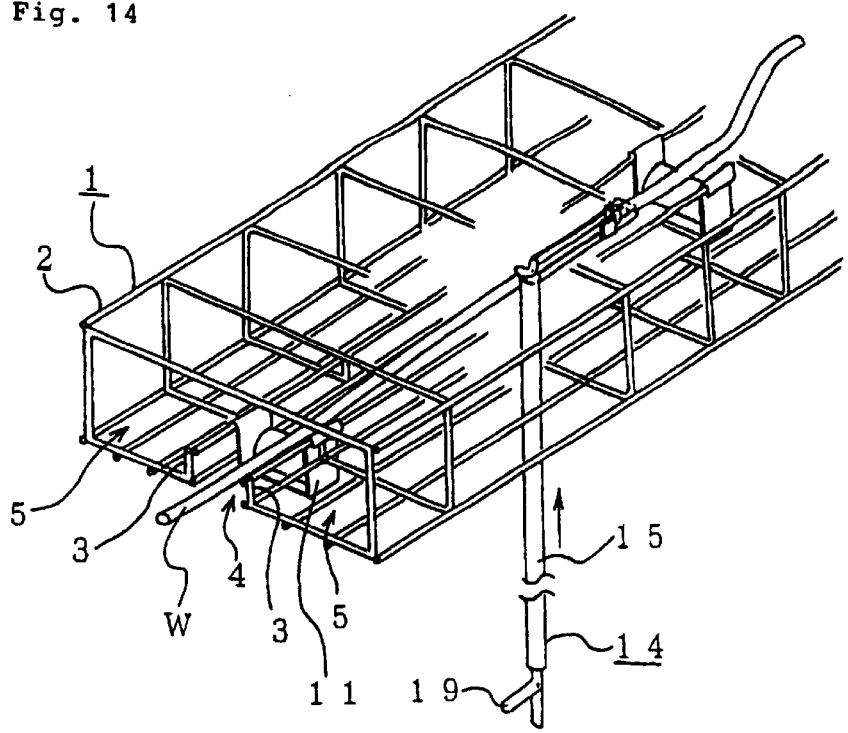
FIG. 14 is a perspective view of the cable bed of FIG. 1 and the cable shifter of FIG. 10, showing a cable shifting process using the cable shifter.
Figure 15:
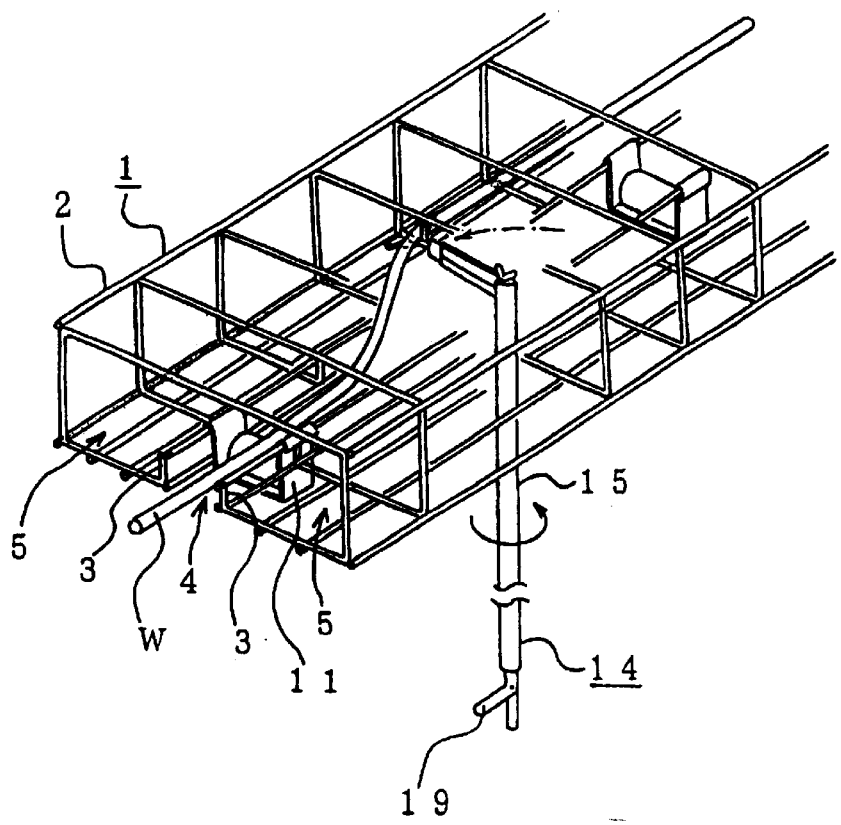
FIG. 15 is a perspective view, showing another cable shifting process.
Figure 16:
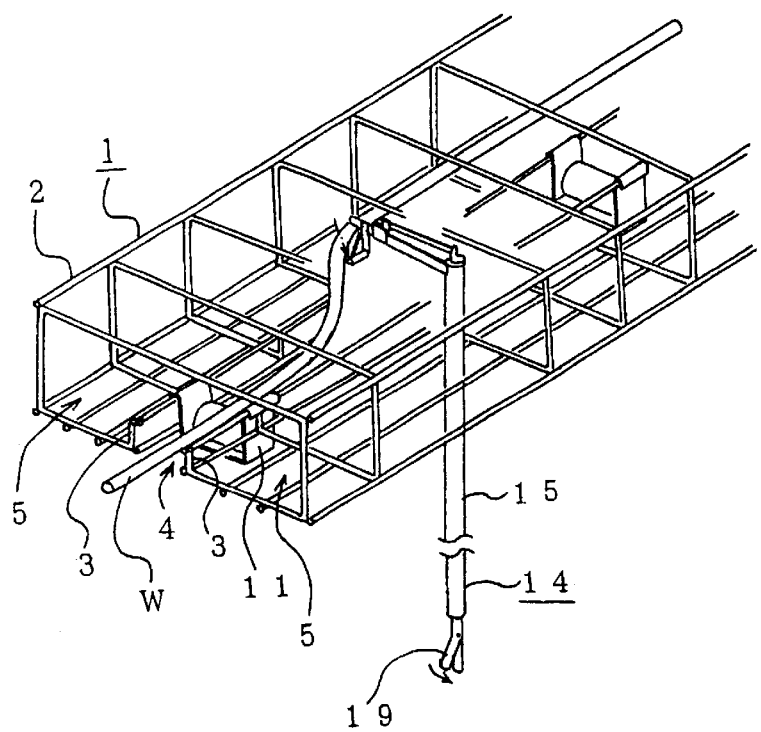
FIG. 16 is a perspective view, showing still another cable shifting process.

FIGS. 14–16 schematically depict how a cable W lying through a drag route 4 is shifted onto a cable housing 5 using the cable shifter 14.

As FIG. 14 shows, the upper portion of the cable shifter 14 is first vertically inserted upward into the cable bed 1 at a desired location between two drag route formers 11 in the drag route 4. A portion of a cable W is held on the cable holder 17, which is further lifted until the cable portion is located within the cable shifting space 6. The cable shifter 14 is then turned horizontally about 90 degrees (in either direction or a desired direction) by turning the pole 15 as shown in FIG. 15 so that the cable portion is held above a cable housing 5.

The cable portion held by the cable holder 17 is then dropped onto the cable housing 5 by squeezing the grip 19 as shown in FIG. 16. The ratchet plate 17d is unlocked from the ratchet 18 and the cable holder 17 hangs down, releasing the cable portion. The cable shifter 14 is moved to the adjacent cable portion which is still on the drag route 4. This process is repeated until the whole cable W is laid through the cable housing 5. It is desirable that cables are laid through the cable housing 5 neatly arranged so that subsequent cable shifting operations can be carried out easily.

As described, cables W are first laid on the drag route 4 and then shifted onto the cable housing 5 according to the present invention. Therefore, trouble of laying cables is greatly reduced as can be readily appreciated by skilled persons belonging in the art. Frictional resistance generated between cables is greatly reduced. Cable tangling and damage can also be effectively eliminated.

Drag route formers 11 are installed only in the drag route 4, and no roll devices 12 are installed within the cable housings 5, greatly reducing manufacturing costs for cable beds incorporating rolls. In addition, cables are far more stably held on the cable housings 5 of the present invention, especially where cable beds are installed slantingly, than on conventional cable beds having rolls.

Figure 17:
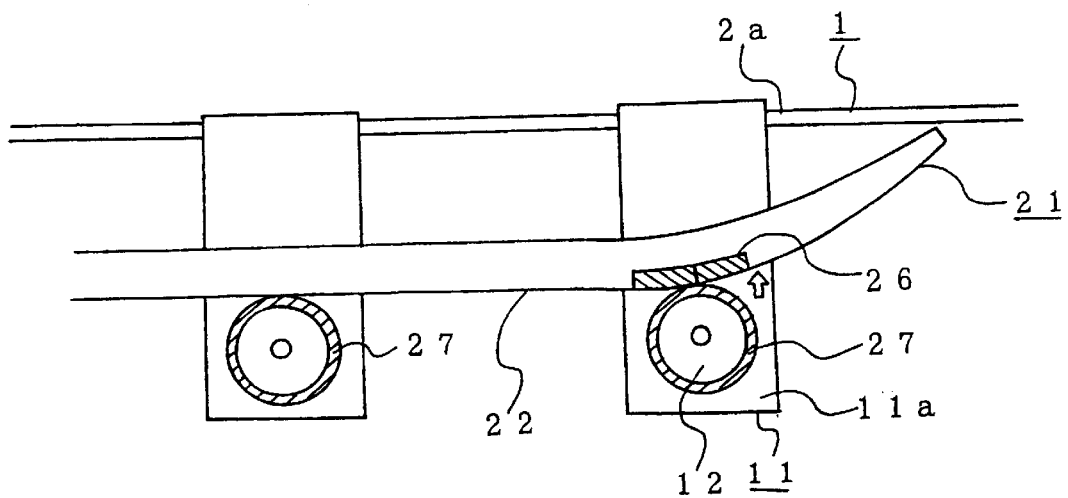
FIG. 17 shows a layer device according to another embodiment of the present invention as placed on a cable drag route.

When roll devices 12 are metallic, the layer device 21 may be provided with magnetic power such as by embedding magnets 26 as shown in FIG. 17 to stabilize the contact between the roll devices 12 and the layer device 21.

Figure 18:
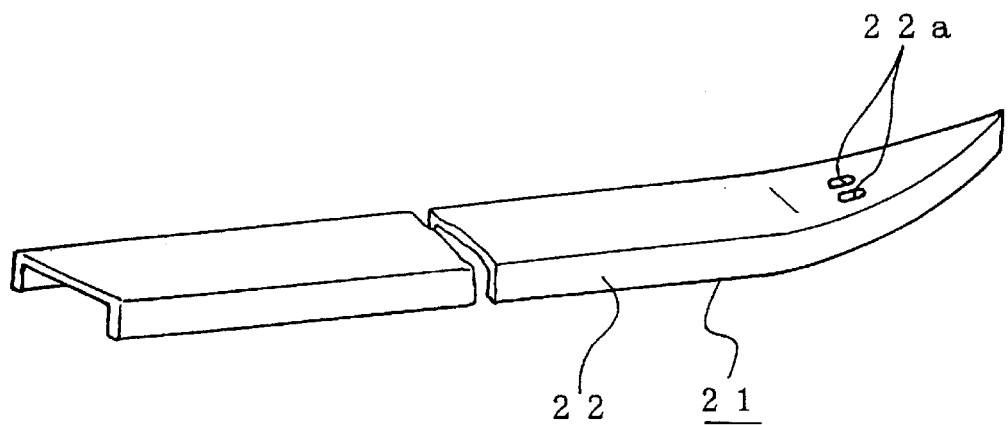
FIG. 18 is a perspective view, showing still another layer device according to an embodiment of the present invention.

As shown in FIG. 18, the head portion 22 of the layer device 21 may be formed having a pair of leg rail portions. The rail portions can improve the rigidity of the head portion 22. By providing such rail portions, friction between the head portion 22 and the roll devices 12 can also be greatly reduced.

Figure 19:
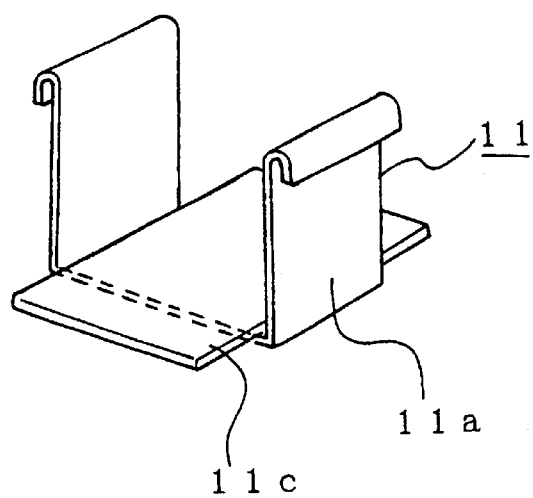
FIG. 19 is a perspective view, showing a drag route former according to another embodiment of the present invention.

The roll devices 12 of the drag route former 11 may be replaced by plastic coating of the bottom face of the (support) plate 11a or placing a slide plate 11c made of an appropriate plastic material on the bottom surface of the (support) plate 11a as shown in FIG. 19.

Figure 20:
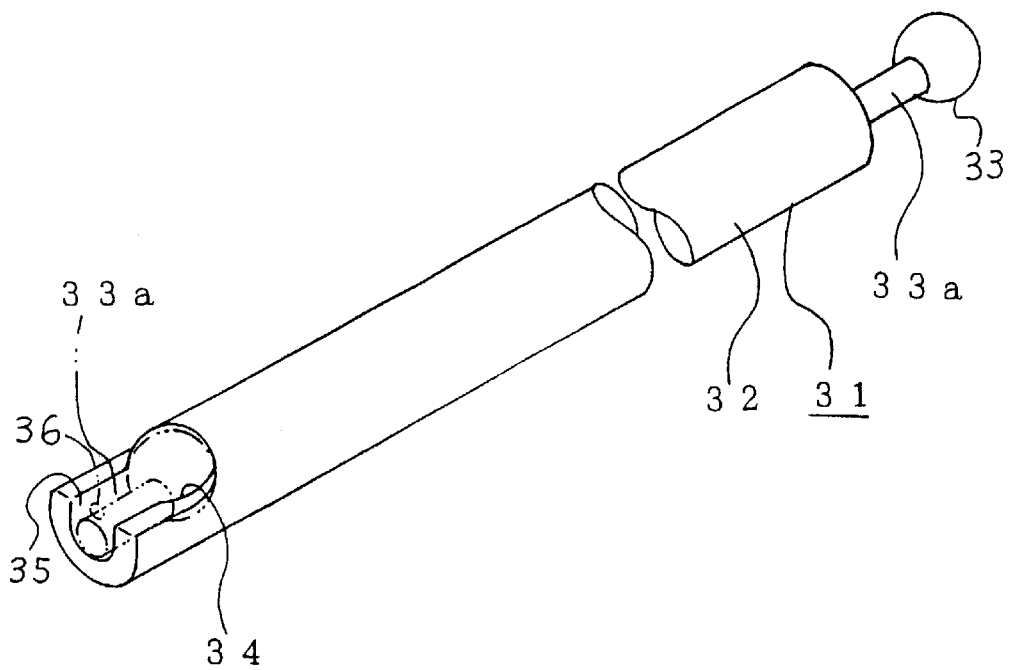
FIG. 20 is a perspective view, showing another type of layer device according to the present invention.
Figure 21:
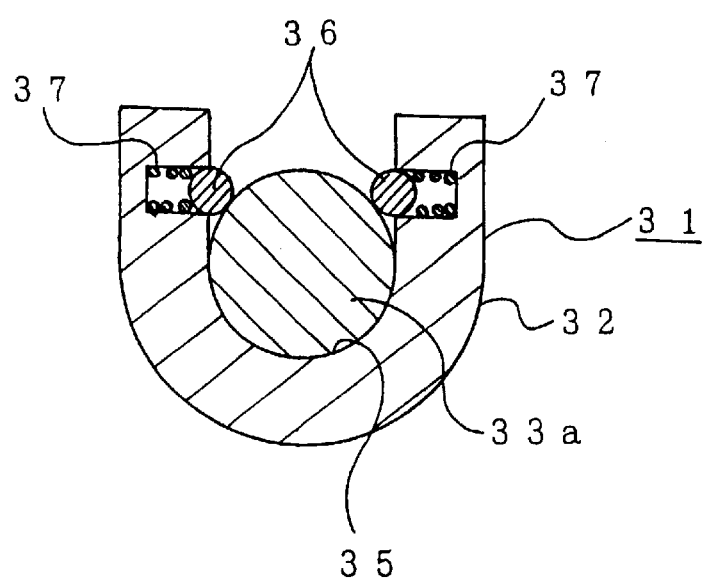
FIG. 21 is a sectional view of the layer device of FIG. 20.

Another type of layer device is shown in FIGS. 20 and 21. This layer device 31 comprises a plurality of rigid rods 32 which are releasably and flexibly connectable head and tail in a line. Connection between each two rods 32 is provided flexibly between a ball 33 protruding from an end of a rigid rod 32 with a neck 33a and a ball receptor 34 provided in an end of the other rod 32 with a groove 35. The ball receptor 34 and groove 35 releasably and flexibly lock the ball 33 and the neck 33a, respectively. The interconnection is further secured by a pair of small rotary balls 36 seated on coil springs 37 provided in two holes formed within the groove 35 such that the neck 33a is locked within the groove 35 as shown in FIG. 21.

As will be readily understood by artisans of the relevant technical field, the ball 33 and neck 33a a rod 32 are pressed from above down in to the ball receptor 34 and groove 35 of another rod 32.

The rigid rods 32 are interconnected in a line and sent forward on the drag route 4 until the head portion of the chain of the rods 32 or layer device 31 reaches the other end of the drag route 4, where a drag rope is tied to the layer device 31 and laid through the drag route 4 by pulling back the layer device 31 all the way through the drag route 4.

Figure 22:
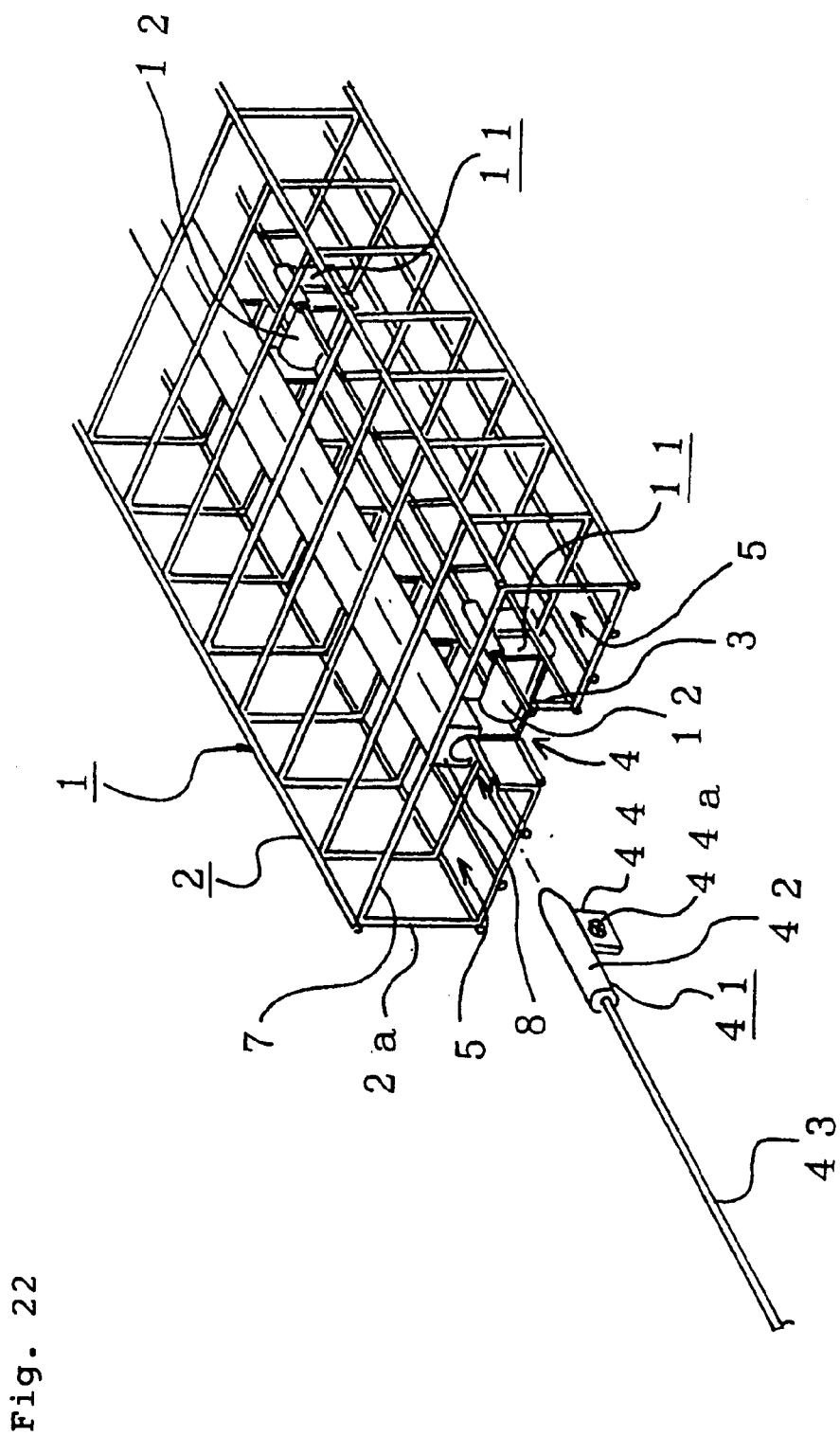
FIG. 22 is a perspective view of another cage-type cable bed having a guide chute and cable drag route, and another type of layer device according to the present invention.
Figure 23:
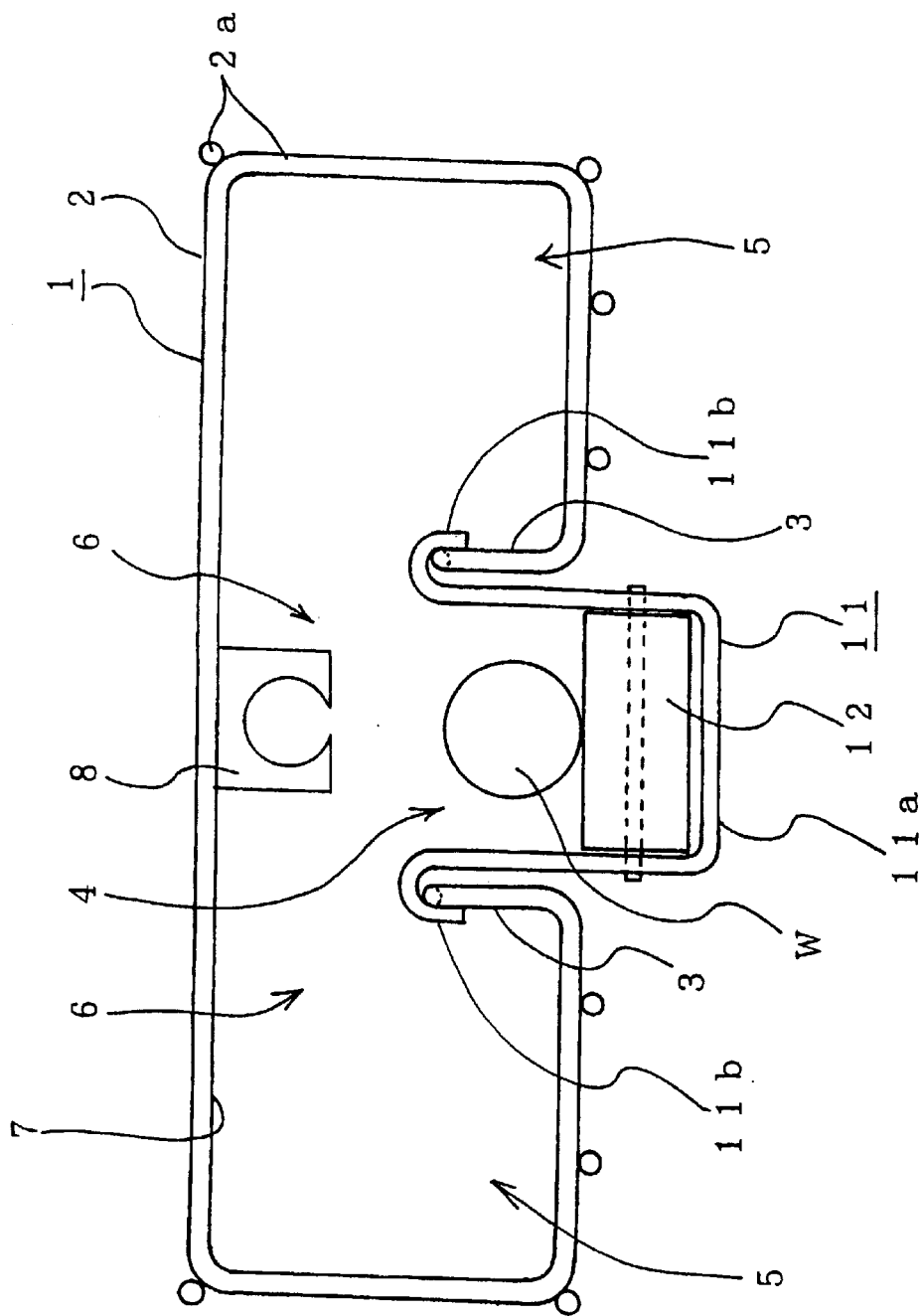
FIG. 23 is a front view of the cable bed of FIG. 22, where a cable is laid in the cable drag route.

FIGS. 22 and 23 show still another type of layer device. This layer device 41 is used for a cable bed 1 additionally having a guide device or chute 8 above the cable drag route 4 which extends in a longitudinal direction of the cable bed 1. The guide chute 8 is provided with a longitudinal opening which opens downward.

The layer device 41 comprises a rocket-shaped shuttle head or head portion 42 having a tongue 44 extending outwardly, which has a connection hole 44a. The layer device 41 further comprises a tail wire 43 which possesses a degree of rigidity. The guide chute 8 receives the layer device 41 with the tongue 44a engaging the longitudinal opening. The layer device 41 can travel through the guide chute 8 as the tail wire 43 is pushed forward gradually by hand.

Figure 24:
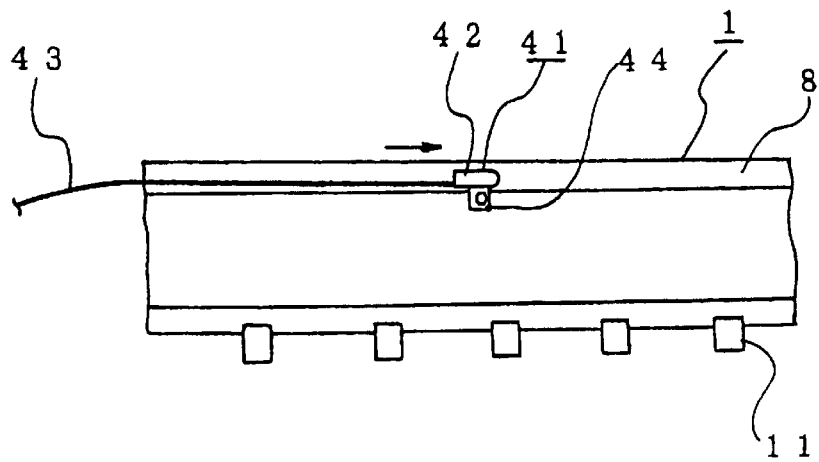
FIG. 24 is a side elevational view, schematically showing a cable dragging process using the layer device of FIG. 22.
Figure 25:
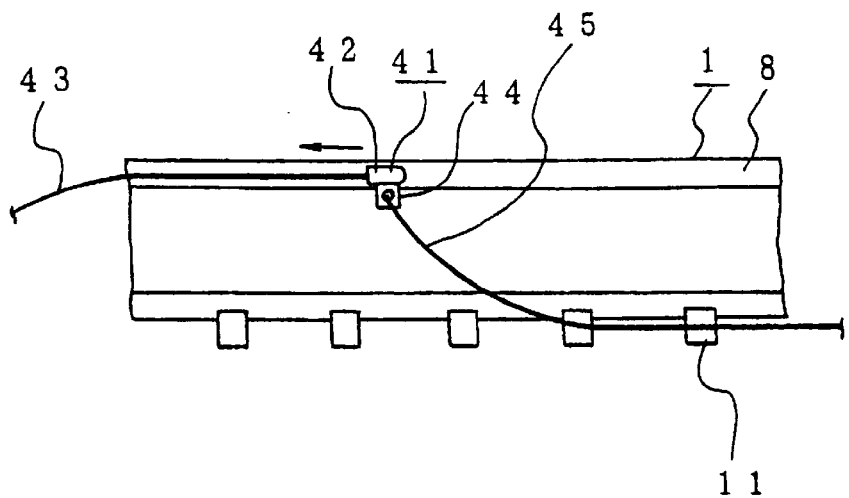
FIG. 25 is a side elevational view, schematically showing another cable dragging process.
Figure 26:
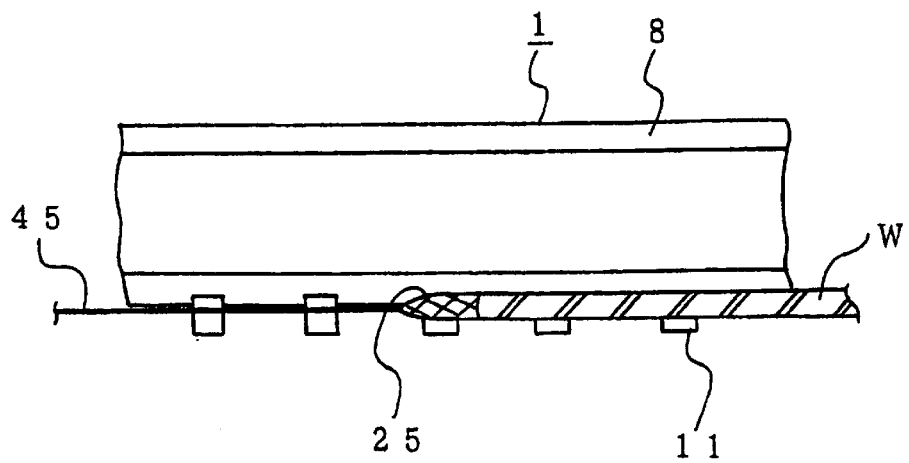
FIG. 26 is a side elevational view, schematically showing still another cable dragging process.

FIGS. 24 to 26 show how a cable W is laid on the cable bed 1 using the layer device 41.

The layer device 41 is inserted from an end opening of the guide chute 8 and gradually sent forward in the guide chute 8 as shown in FIG. 24 by pushing the tail wire 43 by hand until the head portion 42 comes out of the guide chute 8 from the other end opening, where a cable drag rope 45 is connected to the rope connection hole 44a. The layer device 41 is then pulled back through the guide chute 8 together with the drag rope 45 so that the drag rope 45 is laid in the drag route 4 as shown in FIG. 25. A cable W is connected to the drag rope 45, preferably by means of a cable holding device 25. The drag rope 45 is then pulled from the other end of the drag route 4 so as to drag in the cable W onto the cable drag route 4.

Alternatively, the cable drag rope 45 may be sent over the drag route 4 together with the layer device 41, or the cable W may be directly connected to the connection hole 44a, in which case the drag rope 45 can be eliminated altogether. The cable W can be connected to the drag rope 45 at either end of the drag rope 45 after the drag rope 45 is laid through the drag route 4.

Figure 27:
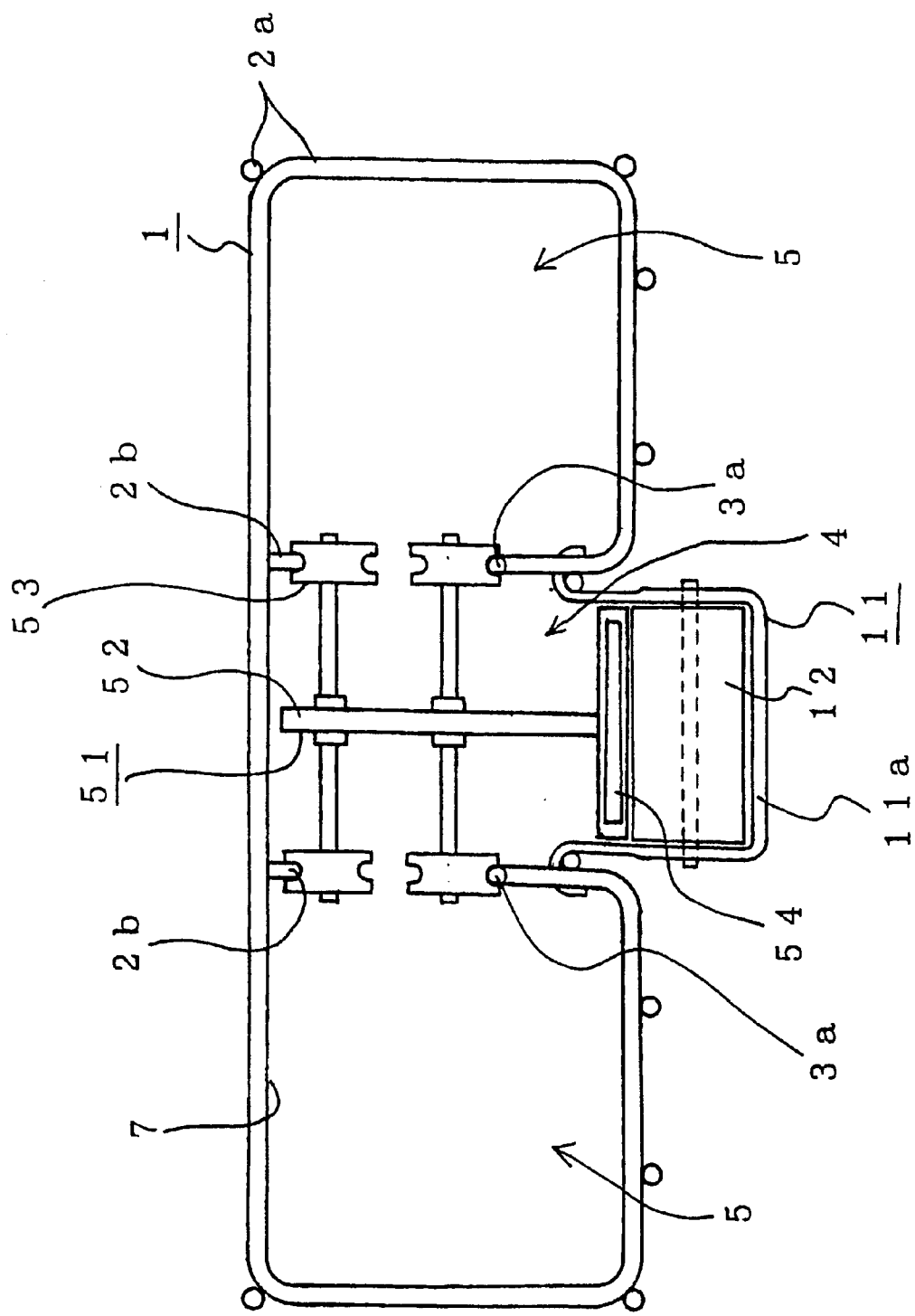
FIG. 27 is a front view of another type of cable bed according to the present invention.
Figure 28:
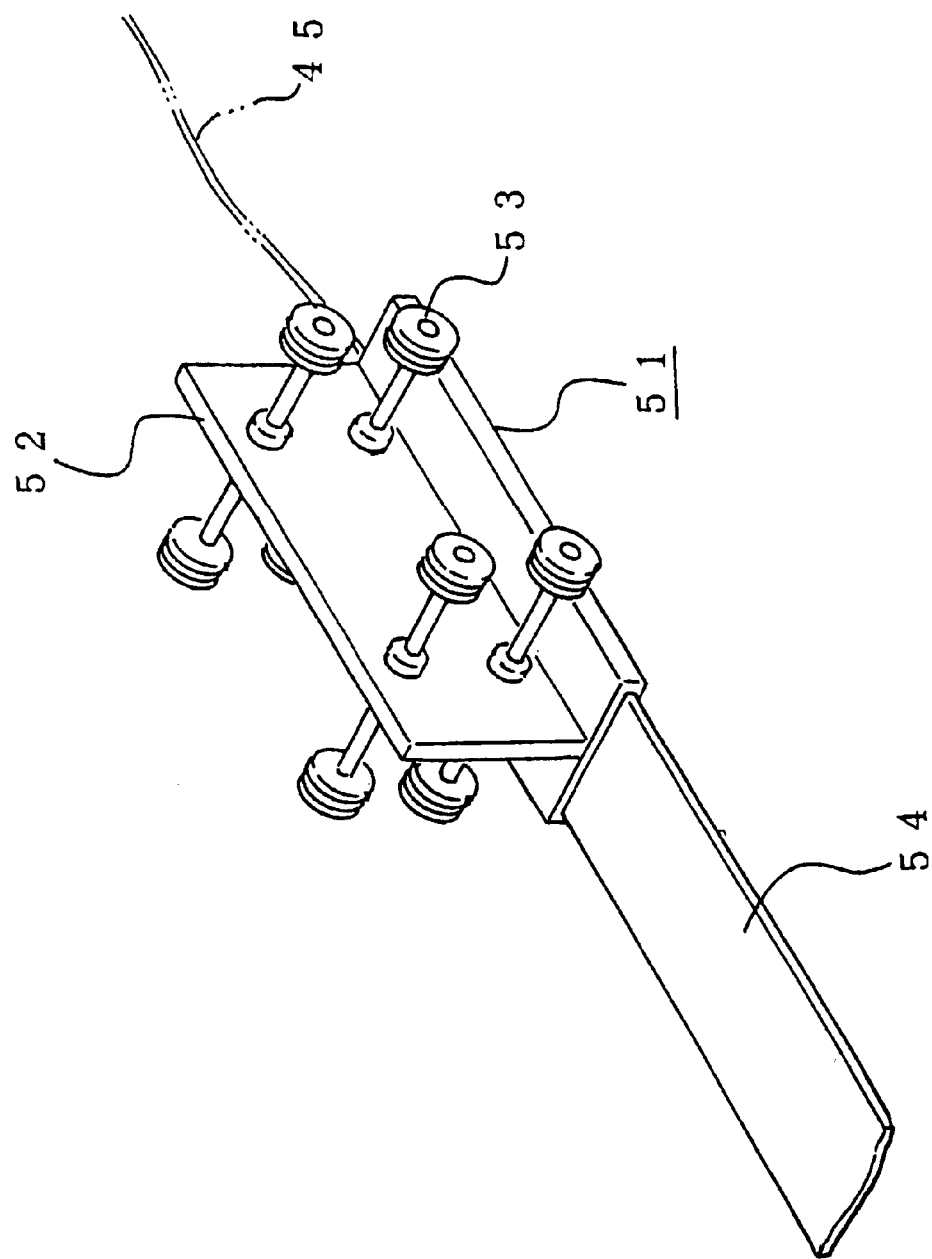
FIG. 28 is a perspective view of a layer device of the present invention to be used for the cable bed of FIG. 27.

FIGS. 27 and 28 show another type of layer device. This layer device 51 is used for a cable bed 1 having pairs of longitudinal guide devices or rails 3a and 2b. The layer device 51 comprises a head portion comprising upper and lower wheels 53 turnably provided on a center plate 52 which stands on a base having an elongated semi-rigid tail 54 as shown in FIG. 28. A drag rope 45 can be connected to the layer device 51 after the layer device 51 is laid through the drag route 4.

The pair of guide rails 2b are provided on the upper surface of the cable bed 1 to receive the upper wheels 53, and the pair of guide rails 3a are provided along the upper edges of the drag route walls to receive the lower wheels 53.

The wheels 53 can run on the guide rails 2b and 3a smoothly. The layer device 51 is gradually sent into a drag route 4 and pushed forward by pushing the flexible but semi-rigid tail belt 54 by hand. The drag rope 45 is connected to the layer device 51 at the other end of the drag route 4.

A cable W is connected to the drag rope 45 and dragged into the drag route 4 as described earlier. Alteratively, the cable W may be directly connected to the layer device 51 and dragged onto the drag route 4.

Figure 29:
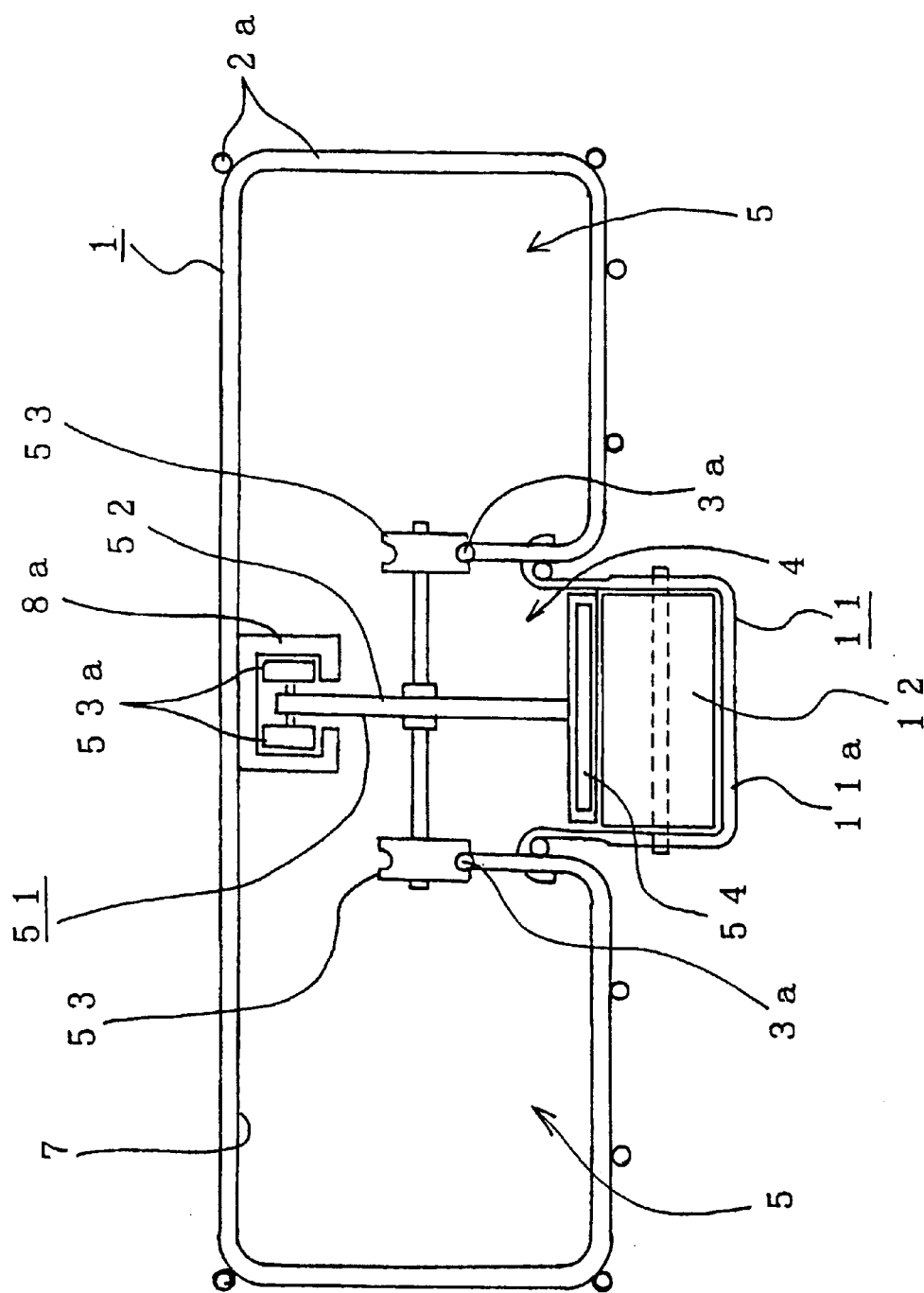
FIG. 29 is a front view of another cable bed having a guide chute according to the present invention.
Figure 30:
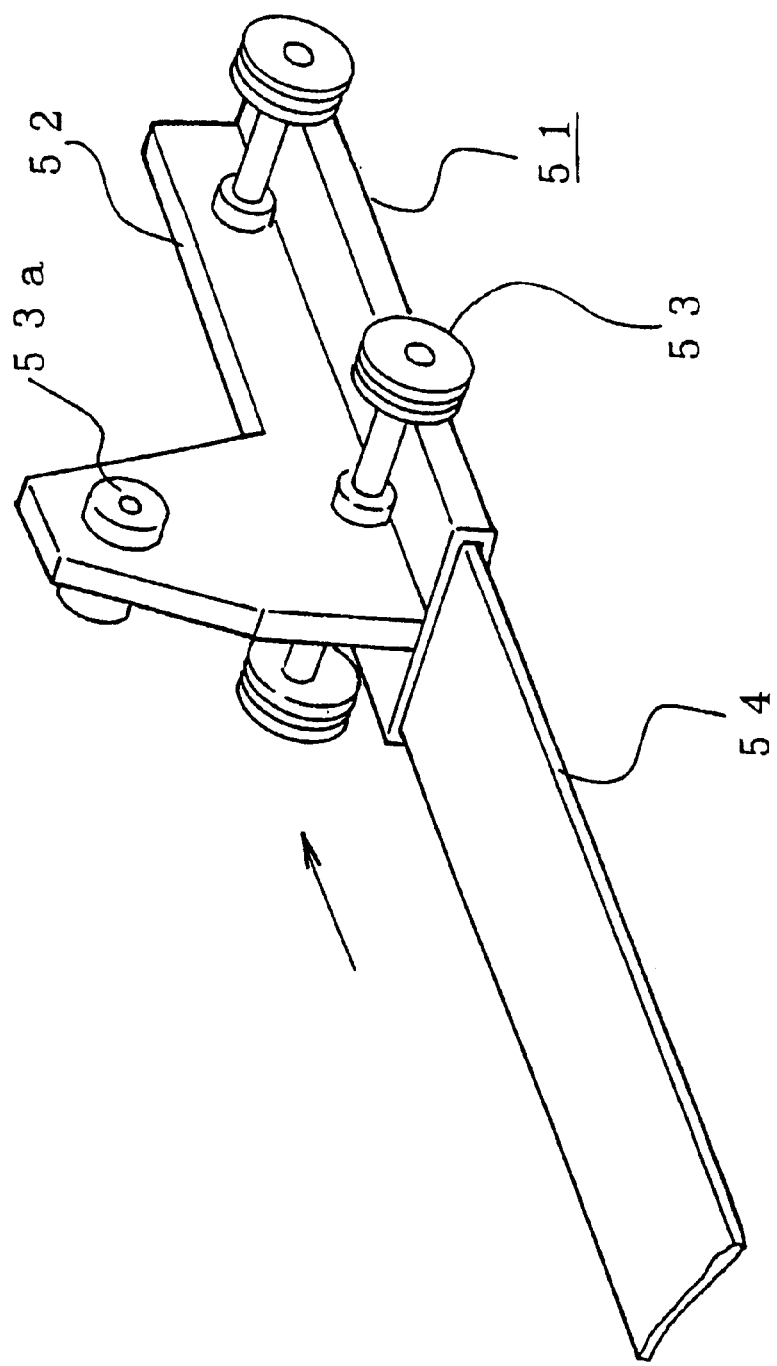
FIG. 30 is a perspective view of a layer device of the present invention to be used for the cable bed of FIG. 29.

For a cable bed 1 having a guide chute 8a such as shown in FIGS. 22 and 23 instead of the guide rails 2b such as shown in FIG. 27, another layer device 51 having wheels 53a such as shown in FIG. 30 may be utilized. The wheels 53a are held within the guide chute 8a while the wheels 53 are held on the guide rails 3a as shown in FIG. 29. The layer device 51 is pushed through the drag route 4 by the semi-rigid but flexible tail belt 54.

A self-propelled layer device disclosed in Japanese Patent Laid-Open Publication No. 8-280114 filed by the assignee may be utilized. This self-propelled layer device runs on the drag route 4 without requiring human hands.

As set forth, a cable laid in the drag route 4 can be shifted to a cable housing by means of a cable shifter 14 such as shown in FIGS. 10–13. A cable on the drag route 4 can be shifted to the cable housing in other appropriate ways as well.

Figure 31:
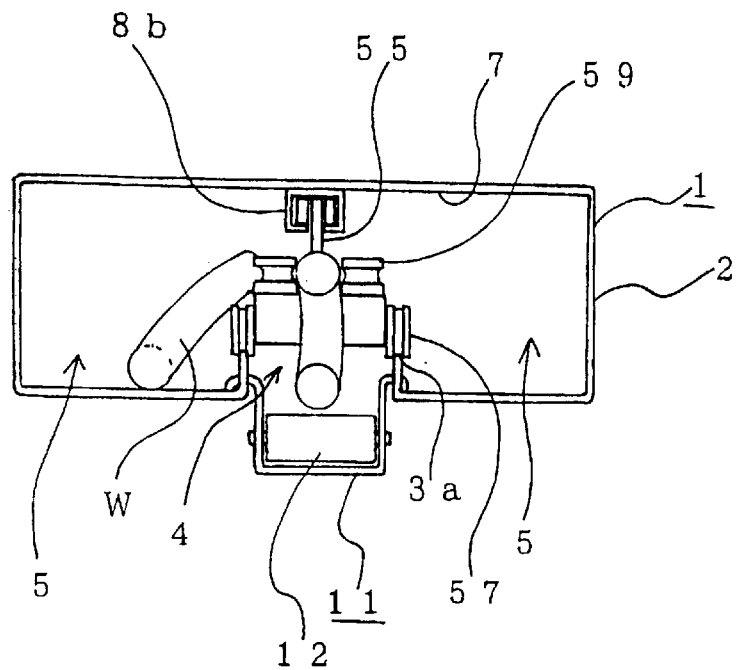
FIG. 31 is a front view, showing a cable shifting process utilizing a cable shifter cart of the present invention.
Figure 32:
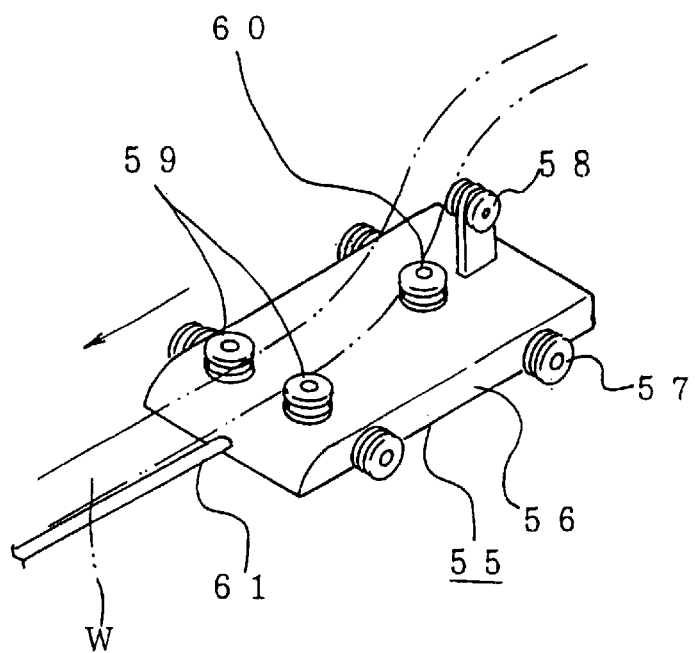
FIG. 32 is a perspective view, showing the cable shifter cart of FIG. 31.
Figure 33:
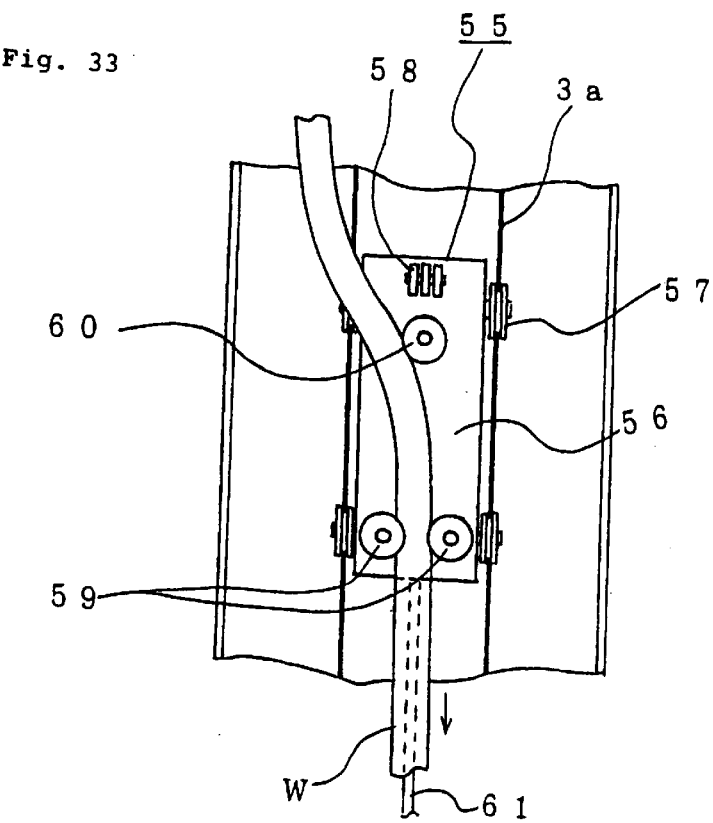
FIG. 33 is a plan view, showing the cable shifter cart of FIG. 31.

An alternative cable shifter is shown in FIGS. 31 to 33. Here, a cable bed 1 has a pair of guide rails 3a along a drag route 4 and guide chute 8b over the drag route 4.

In FIG. 32 is shown a wheeled cable shifter cart 55 comprising a base body 56 having a wheel 58 which engages the guide chute 8b and wheels 57 which are received and run on the guide rails 3a. A drag rope 61 is attached to the base body 56. The cable shifter cart 55 further comprises a pair of wheels 59 and a wheel 60. A cable W is held between the wheels 59 and runs on either side (a desired side) of the wheel 60 such that the cable W may be shifted onto a cable housing 5 as shown in FIG. 33.

As will be readily appreciated by a person skilled in the art, the cable shifter cart 55 is pulled along the cable drag route 4 where a cable W is laid in order to shift the cable W onto the cable housing 5 after a portion of the cable W is somehow placed on the cable housing 5.

This cable shifter cart 55 can travel through the drag route 4 as set forth earlier in connection with cable layer devices.

The cable shifter cart 55 may be utilized as a layer device as well such as shown in FIGS. 29 and 30 if the rope 61 is a replaced by a semi-rigid/flexible tail belt 54.

It is noted that, where possible, a cable W lying on the cable route 4 may be shifted onto the cable housing 5 all manually.

Figure 34:
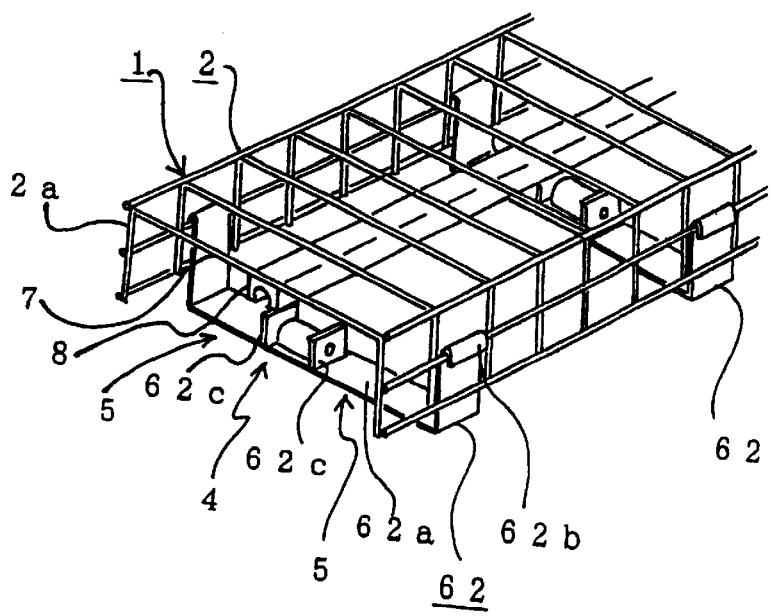
FIG. 34 is a perspective view of another cage-type cable bed according to an embodiment of the present invention.
Figure 35:
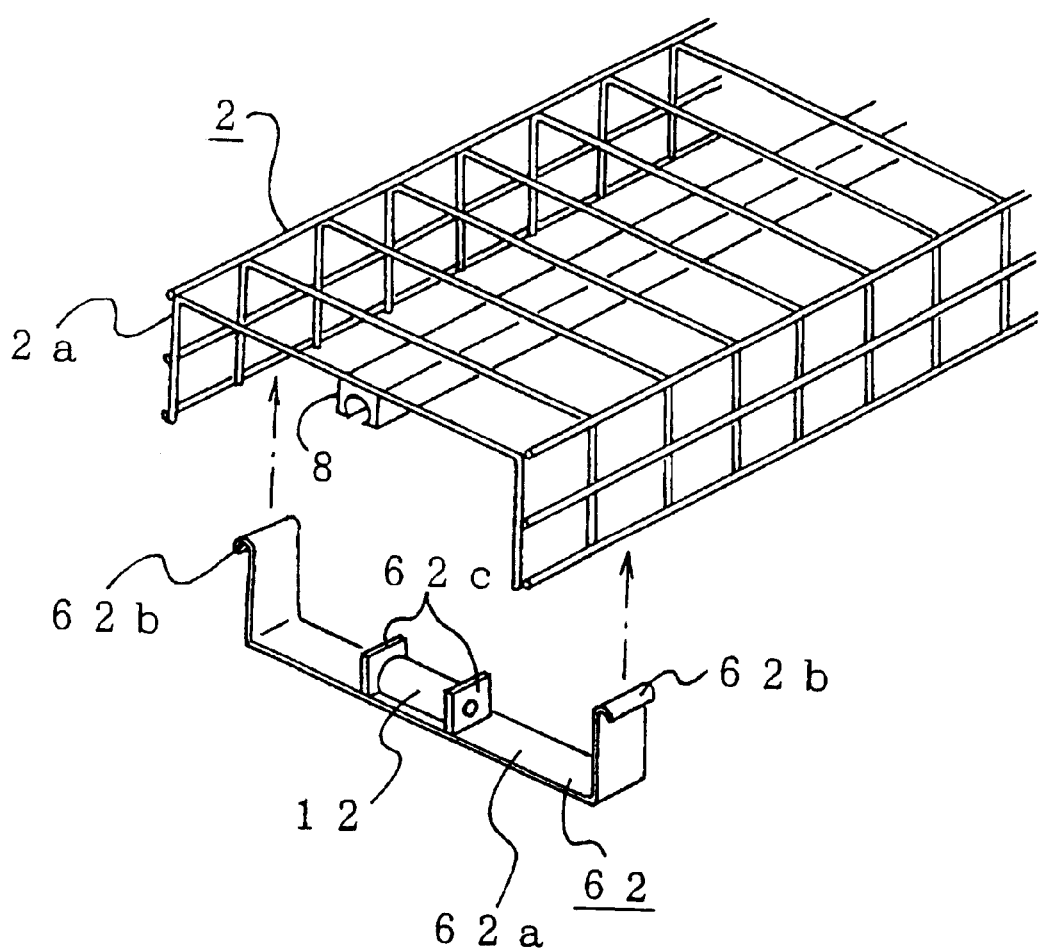
FIG. 35 is an exploded view of the cable bed of FIG. 34.

FIGS. 34 and 35 show another type of cable bed 1 comprising a cable bed body 2 consisting of wires 2a bent and welded to form a reverse-tray shape shown in FIG. 35, where a plurality of cable receivers 62 (cable drag route 4 and housings 5) are attached underside of the cable bed body 2 in parallel as shown in FIG. 34. The bed body 2 is provided with a guide chute 8. Each cable receiver 62 includes a support plate 62a which is bent at two places to provide hook portions 62b. The cable receiver 62 also includes a roll device 12 having a pair of walls 62c as shown in FIG. 35. The cable receiver 62 is mounted on the cable bed body 2 by means of the hook portions 62b.

Here, a drag route 4 is provided on a plurality of roll devices 12 arranged in axial alignment and cable housings 5 are provided on both sides of the roll devices 12 arranged in axial alignment.

FIGS. 36 to 39 show other types of cable beds 1.

Figure 36:
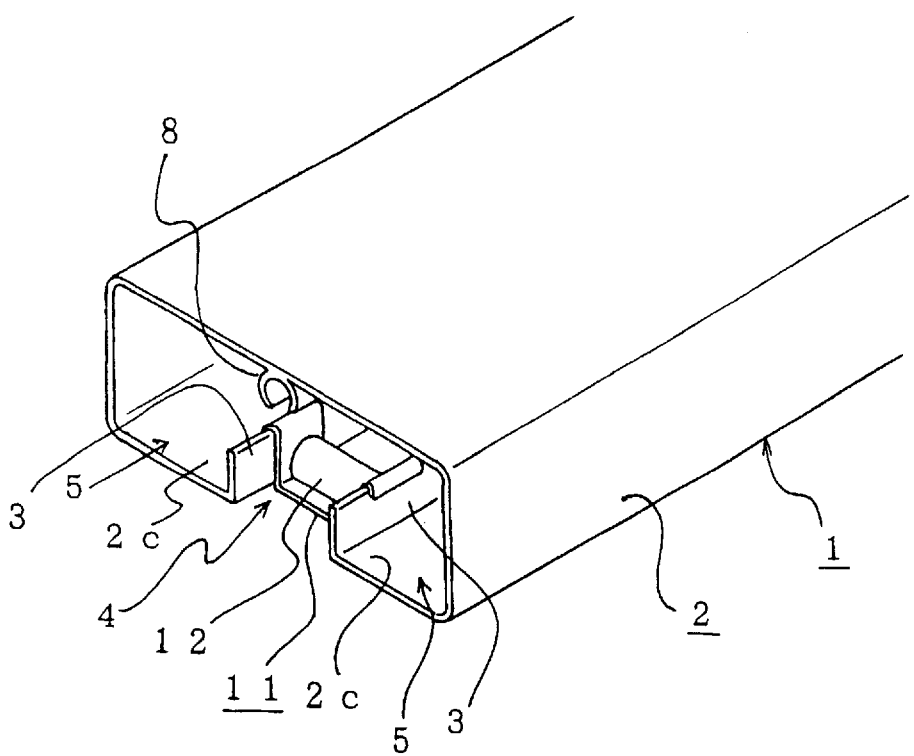
FIG. 36 is a perspective view of a solid-type cable bed according to an embodiment of the present invention.

The cable bed 1 shown in FIG. 36 is a solid box type, having a guide chute 8 and a longitudinal opening along the center of the bottom between a pair of longitudinally extending route walls 3. A drag route 4 is provided through this opening and cable housings 5 are provided on both sides of the drag route 4. The drag route 4 are formed with a plurality of route formers 11 each comprising a roll device 12, which are hung from the route walls 3 by means of the hook portions provided on the side edges of the route formers 11 as shown in FIG. 36.

This cable bed 1 can be utilized identically with the cable beds set forth earlier. The solid-type cable bed 1 may be of a metallic material or plastic material.

Figure 37:
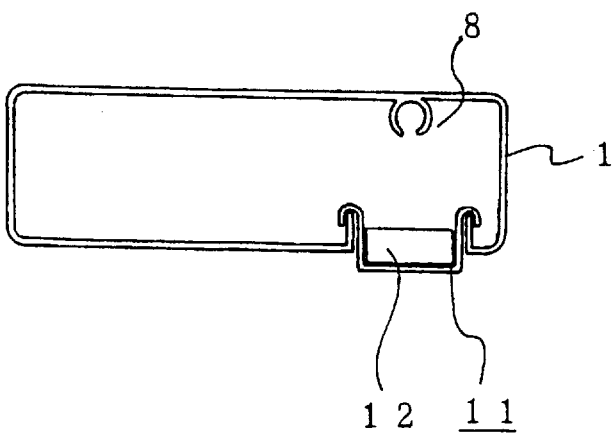
FIG. 37 is a front view of a modification of the cable bed of FIG. 36.

The drag route 4 may be provided off the center of the bottom such as shown in FIG. 37. Naturally, the guide chute 8 is provided off the center of the upper inner surface or over the off-center drag route 4 as shown.

Figure 38:
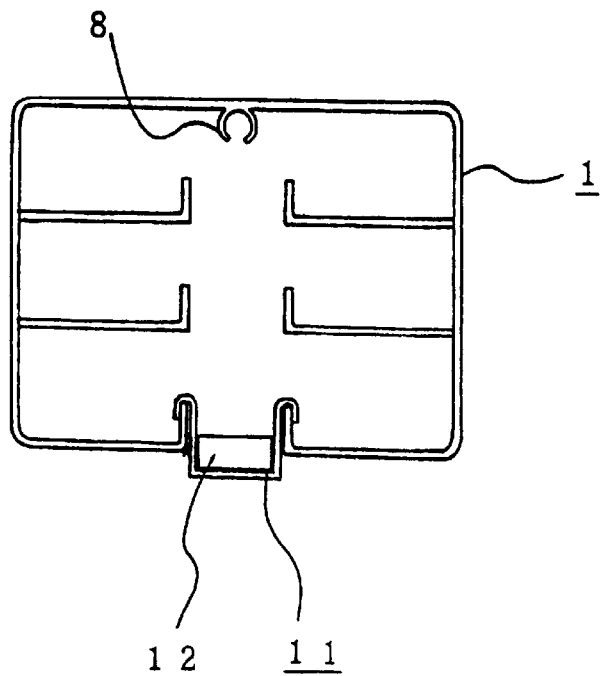
FIG. 38 is a front view of another modification of the cable bed of FIG. 36.

It is possible to provide a plurality of cable housings 5 at different levels as shown in FIG. 38.

Figure 39:
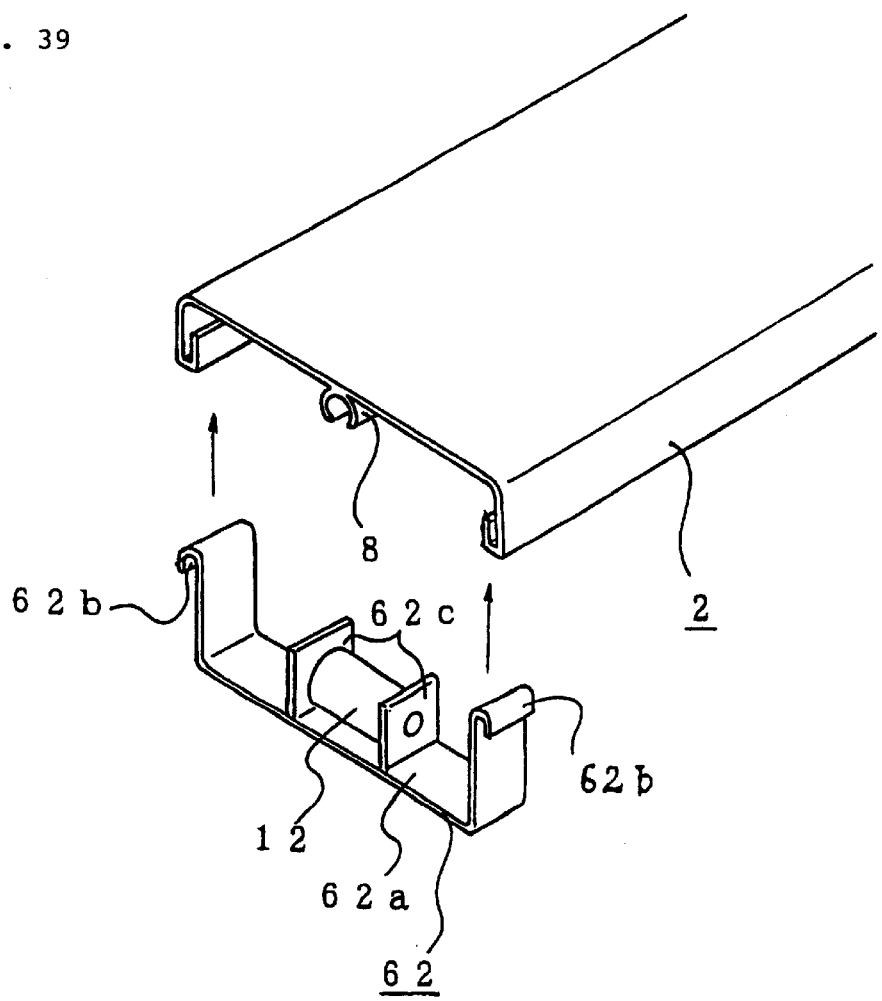
FIG. 39 is a perspective view of a reverse tray-type cable bed according to an embodiment of the present invention.

FIG. 39 shows still another embodiment of a solid cable bed 1, which is similar to the cable bed shown in FIG. 35. The bed body 2 has a pair of hooks on both edges so as to engage the hook portions 62b of the cable receiver 62.

Figure 40:
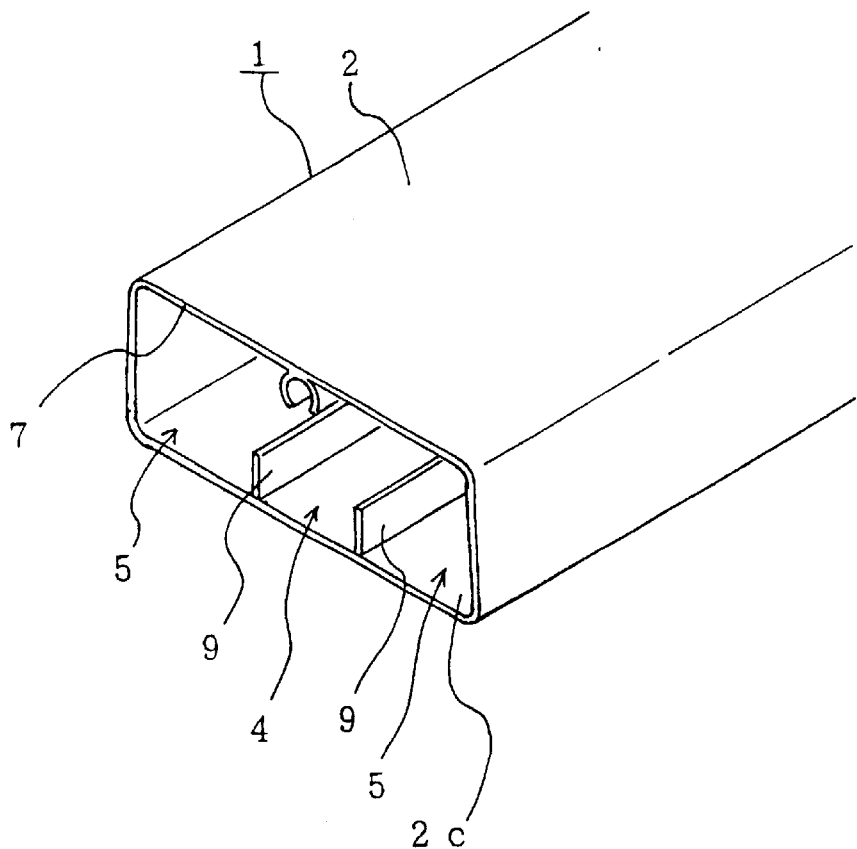
FIG. 40 is a perspective view of still another solid-type cable bed according to an embodiment of the present invention.
Figure 41:
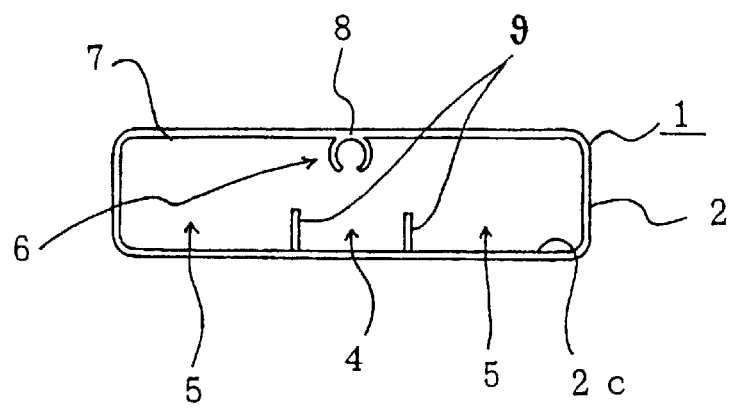
FIG. 41 is a front view of the cable bed of FIG. 40.

FIGS. 40 and 41 show an example of a cable bed 1 whose drag route 4 is not opened downward. The drag route 4 is provided by and between a pair of longitudinal route walls 9.

Figure 42:
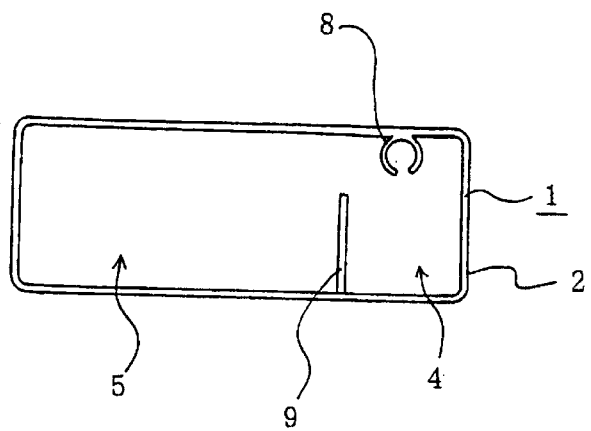
FIG. 42 is a front view of a modification of the cable bed of FIG. 40.

The drag route 4 can be provided by a single route wall 9 as shown in FIG. 42, where s single wide cable housing 5 is provided.

The cable beds 1 shown in FIGS. 36 to 42 all have a guide chute 8. These cable beds 1 can be utilized as set forth earlier in connection with cable beds having a guide chute.

Figure 43:
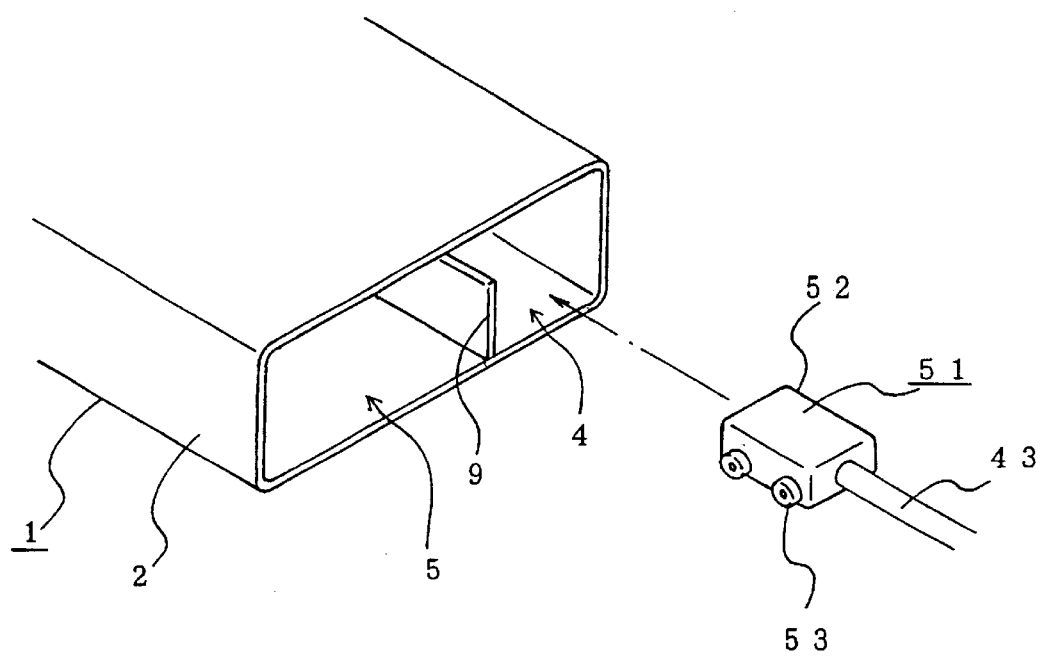
FIG. 43 is a perspective view showing the cable bed of FIG. 42 and a layer device prepared according to the present invention.

On the other hand, the cable bed 1 shown in FIG. 43 is not provided with a guide chute, where a layer device such as shown in FIG. 43 may be utilized, comprising a base body 52, wheels 53 and a semi-rigid but flexible wire 43 in a manner as taught earlier.

Figure 44:
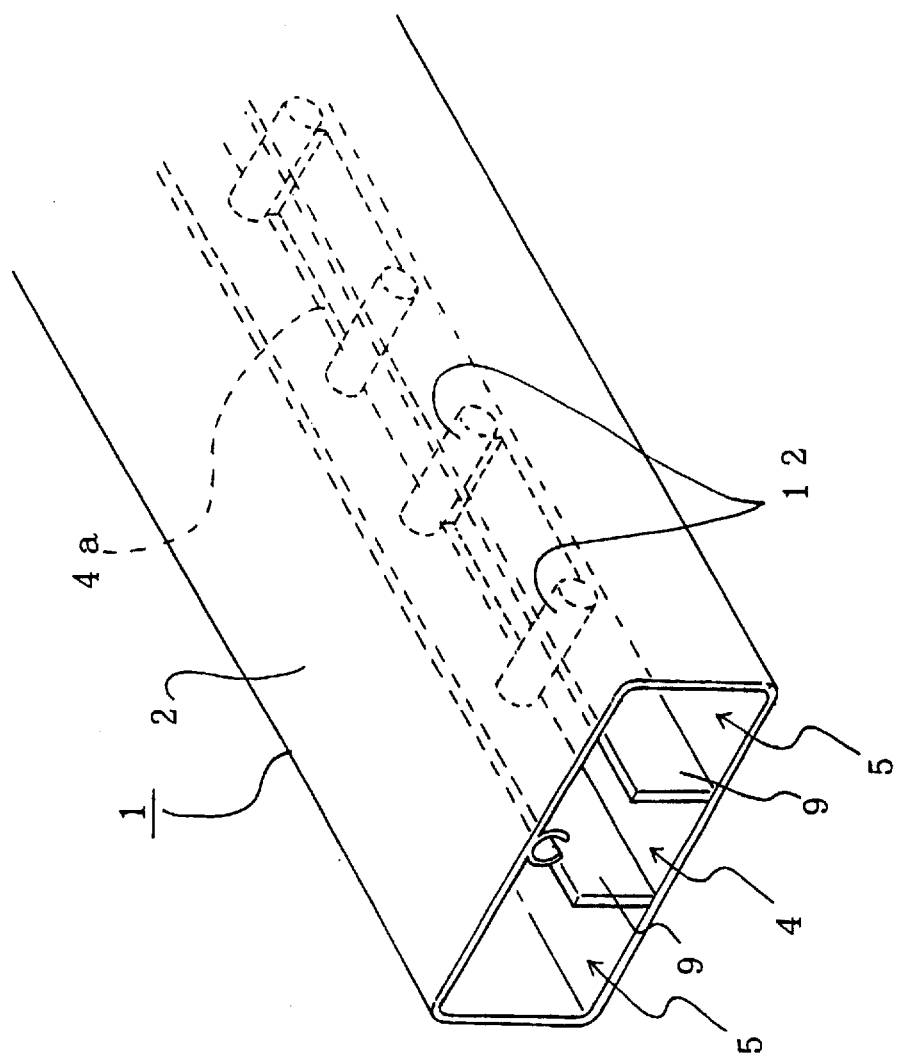
FIG. 44 is a perspective view of a modification of the cable bed of FIG. 40.

Such a drag route 4 may be provided with a plurality of openings 4a at appropriate intervals. The openings 4a may be provided with a plurality of roll devices 12 to assist in dragging a cable (not shown) as shown in FIG. 44 without damaging the cable.

Figure 46:
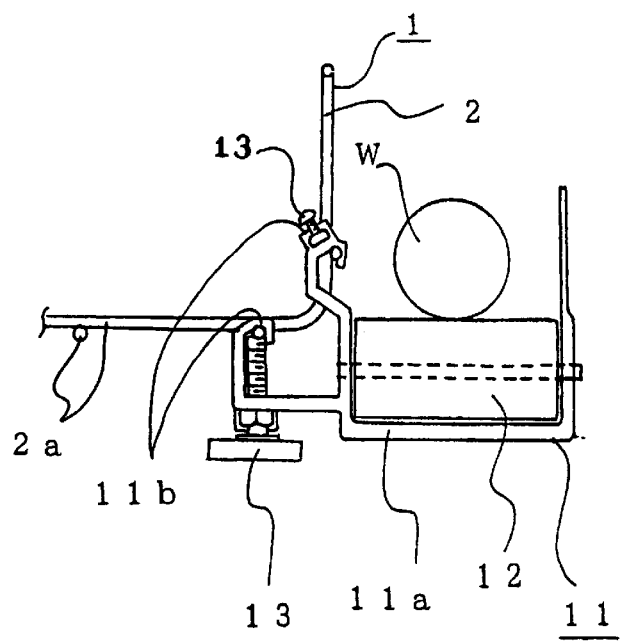
FIG. 46 is a front view showing the drag route former of FIG. 45 as attached to the cable bed.
Figure 47:
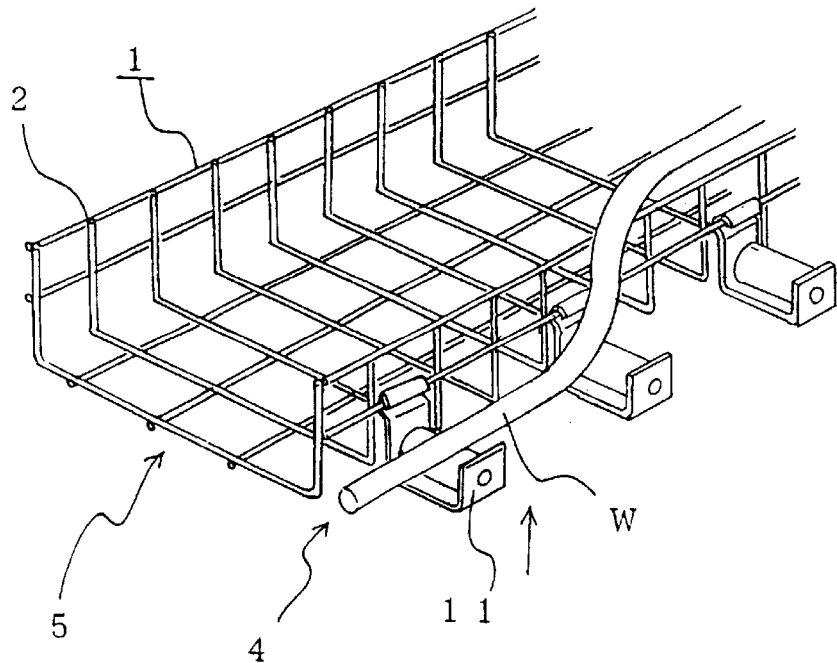
FIG. 47 is a perspective view, showing a cable shifting process from the cable drag route onto a cable housing of the cable bed of FIG. 45.
Figure 48:
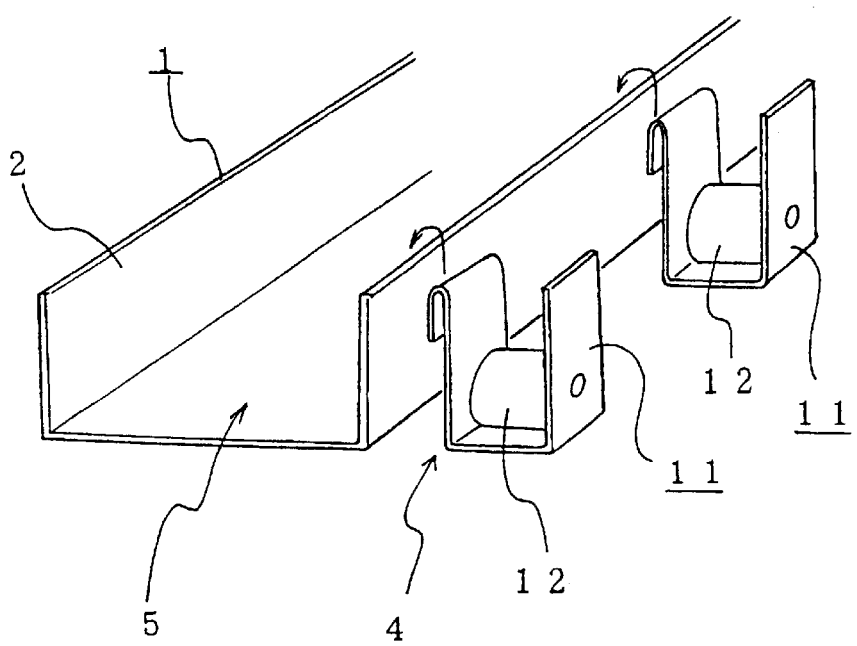
FIG. 48 is a perspective view of a solid-type cable bed having a cable drag route outside its bed body according to another embodiment of the present invention.
Figure 49:
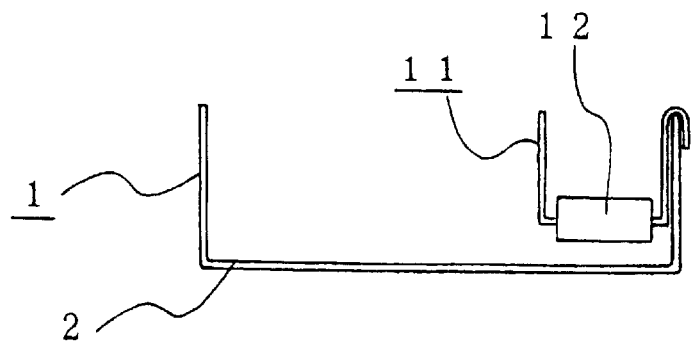
FIG. 49 is a front view of a variation of the cable bed of FIG. 48.
Figure 50:
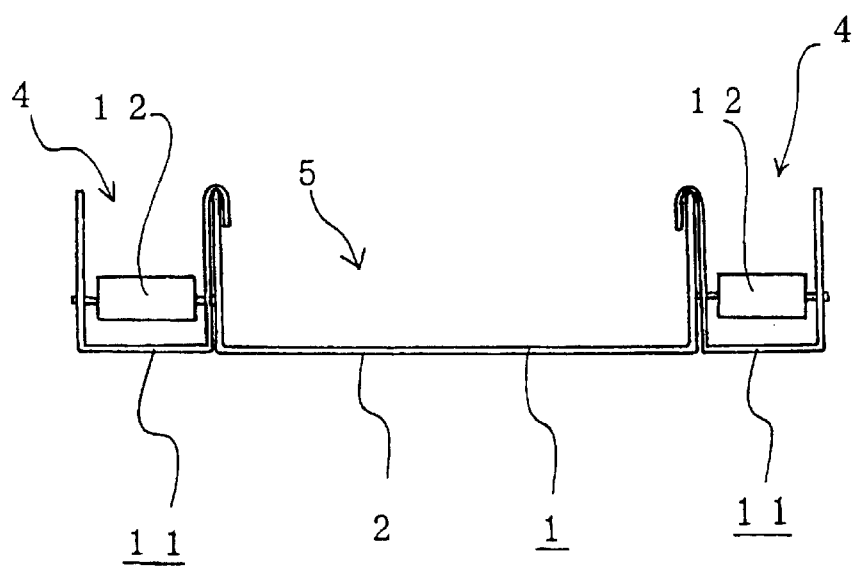
FIG. 50 is a front view of another variation of the cable bed of FIG. 48.
Figure 51:
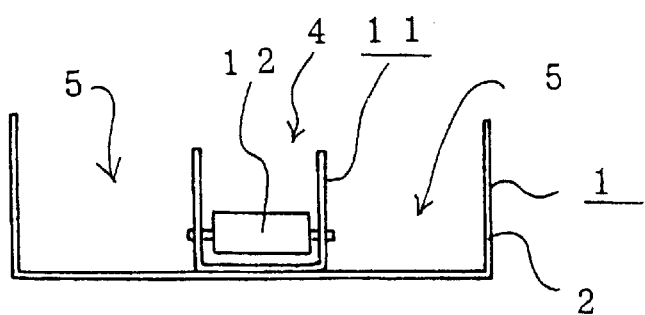
FIG. 51 is a front view of still another variation of the cable bed of FIG. 48.

FIGS. 45 to 47 show another type of cable bed which is a tray or rack type, comprising a bed body 2 made of wires 2a. A drag route 4 is provided outside of a side wall as shown in FIG. 45 by means of a plurality of route formers 11 each attached to the side wall on one side face with an attachment means 13 as shown in FIG. 46. A layer device 21 such as shown in FIG. 45 may be utilized. A single cable housing 5 is provided on the bed body 2. A cable laid on the drag route 4 can be shifted onto the cable housing 5 as explained earlier and shown in FIG. 47.

FIGS. 48 to 59 show solid types of cable beds 1 of various configurations, also showing drag routes 4 and cable housings 5 provided in a variety of locations and ways. A person skilled in the art will readily understand these variations from the disclosures set forth earlier.

Figure 52:
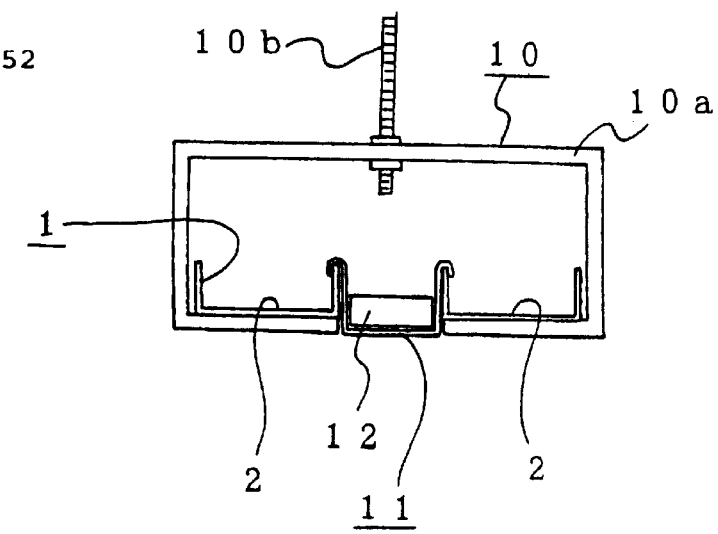
FIG. 52 is a front view of a duct-type cable bed according to another embodiment of the present invention.
Figure 53:
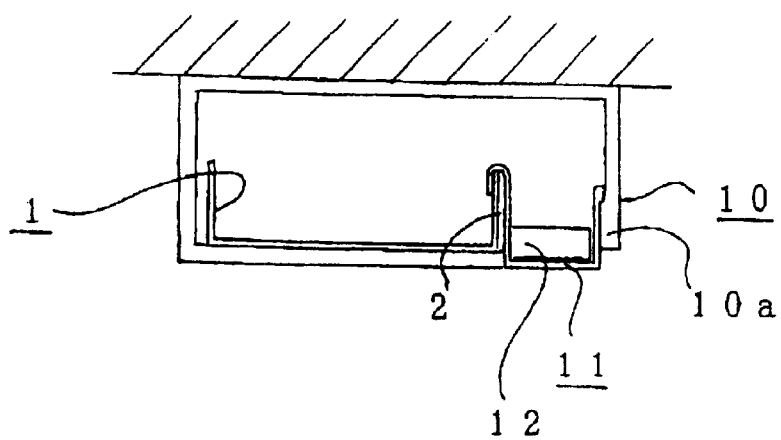
FIG. 53 is a front view of a variation of the duct-type cable bed of FIG. 52.

FIG. 52 shows a cable bed 1 housed in a cable bed case 10 comprising a box body 10a, which is hung from a ceiling (not shown) with bore screws 10b in the center of the upper wall of the box body 10a, while FIG. 53 shows a cable bed 1 housed in a cable bed casing 10 firmly attached to a ceiling.

Figure 54:
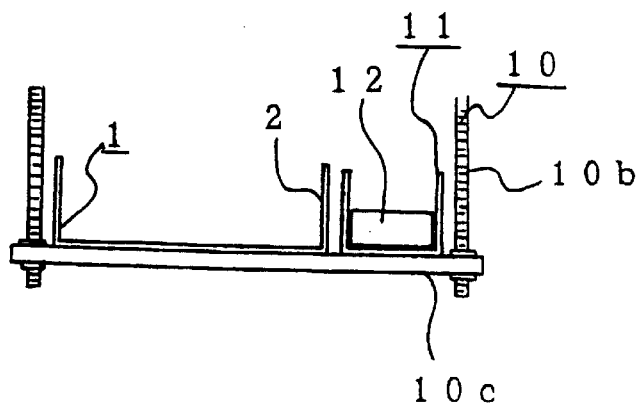
FIG. 54 is a front view of a cable bed according to another embodiment of the present invention.

FIG. 54 shows a cable bed 1 secured on a plate 10c which is hung from a ceiling (not shown) with bore screws 10b secured on both edges of the plate 10c.

Figure 55:
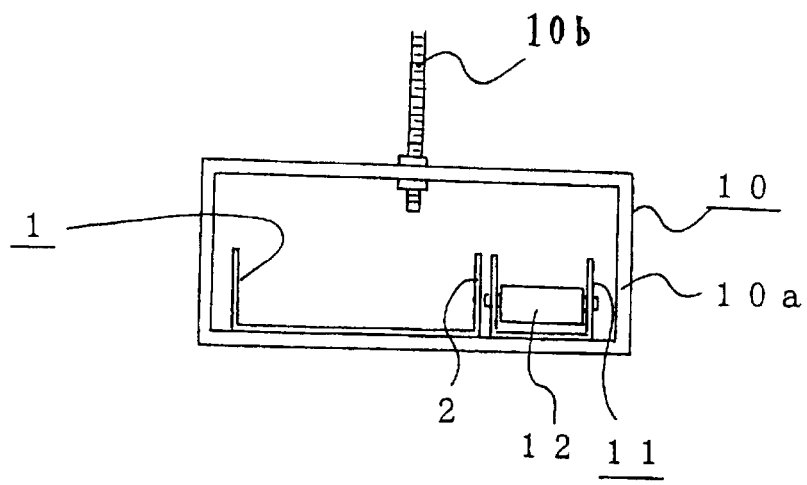
FIG. 55 is a front view of a variation of the cable bed of FIG. 54.
Figure 56:
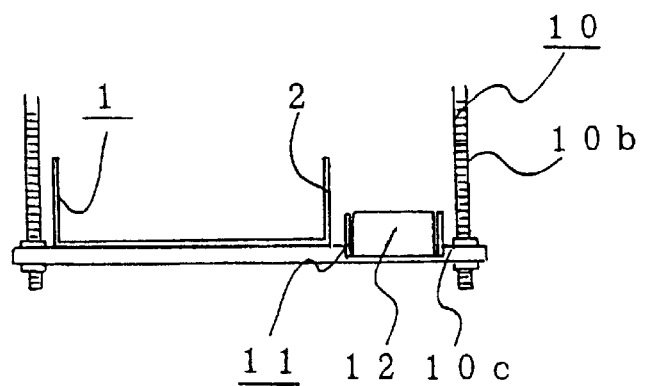
FIG. 56 is a front view of another variation of the cable bed of FIG. 54.

The cable beds 1 shown in FIGS. 55 and 56 are variations of the cable beds shown in FIGS. 52 and 54, respectively.

Figure 57:
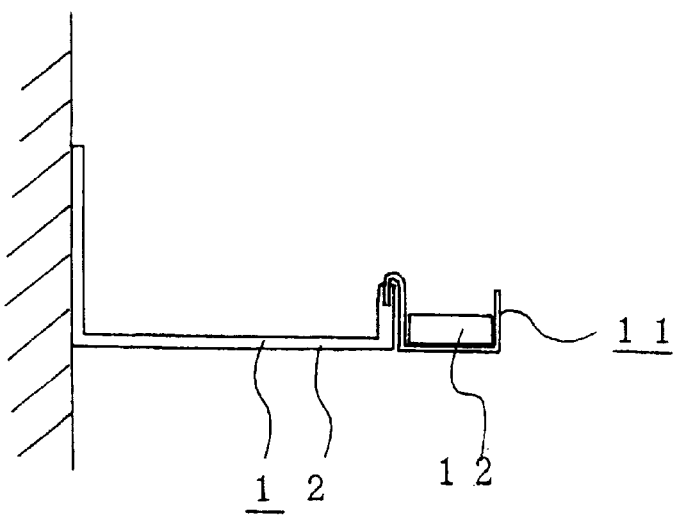
FIG. 57 is a front view of a cable bed according to another embodiment of the present invention.

The cable bed 1 shown in FIG. 57 is a simplified modification, where a cable bed casing 10 is eliminated.

Figure 58:
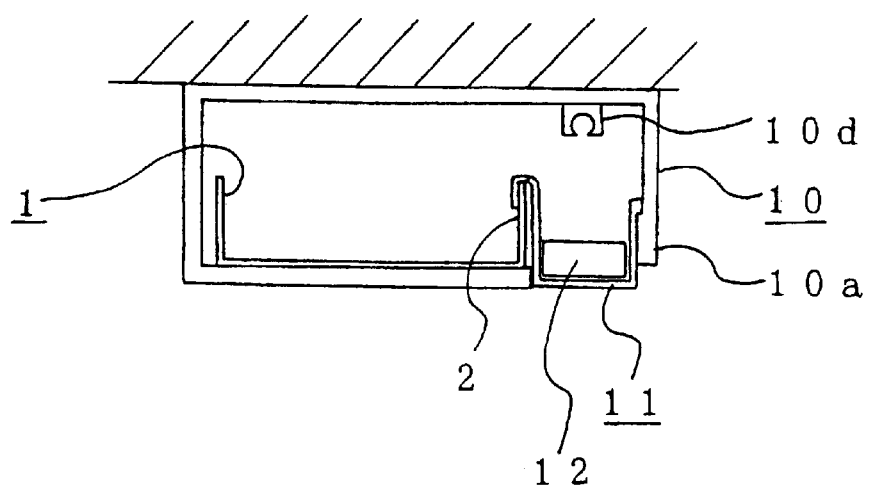
FIG. 58 if a front view of a modification of the cable bed of FIG. 53, further having a chute.
Figure 59:
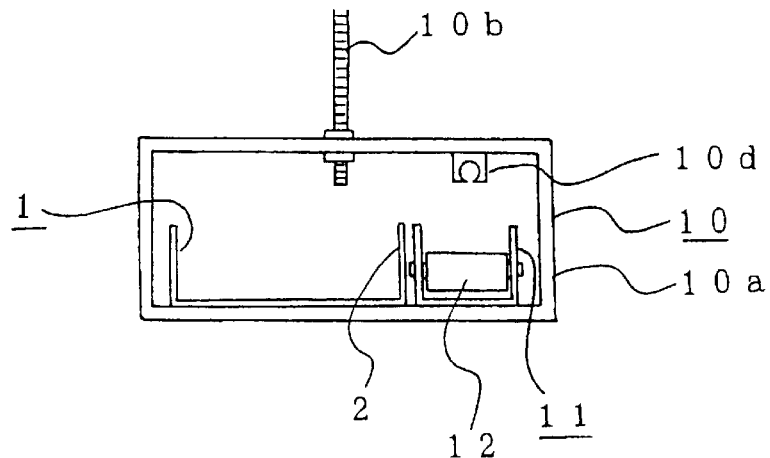
FIG. 59 is a front view of a modification of the cable bed of FIG. 55, further having a chute.

FIGS. 58 and 59 show cable beds 1, each having a guide chute 10d, which are modifications of the cable beds 1 shown in FIGS. 53 and 55, respectively.

Figure 60:
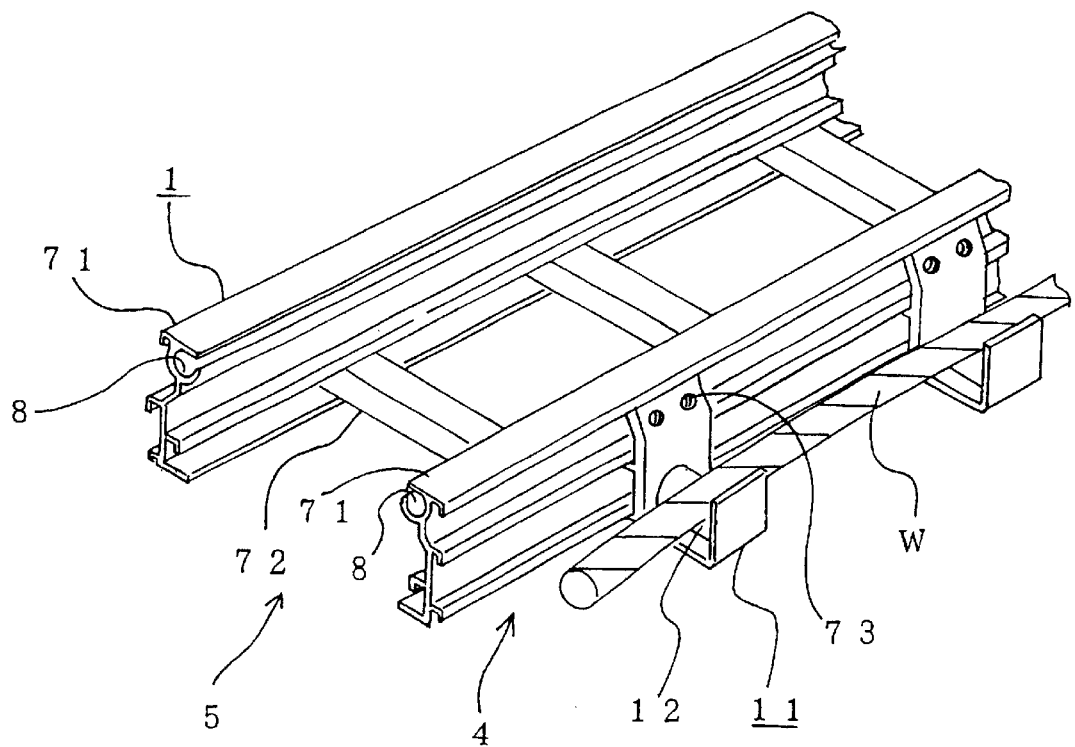
FIG. 60 is a perspective view of a ladder-type cable bed having a cable drag route outside and a guide chute inside according to an embodiment of the present invention.

FIGS. 60 shows a ladder-type cable bed 1 comprising a pair of rails 71 and a plurality of rungs 72 provided between the rails 71 in parallel. Each rail 71 has a guide chute 8 along its upper edge, which opens inwardly. A plurality of drag route formers 11 are attached on the outer surface of one of the rails 71 with attachment means 73 to provide a drag route 4. Each route former 11 has a roll device 12. A single cable housing 5 is provided on the ladder rungs 72.

Figure 61:
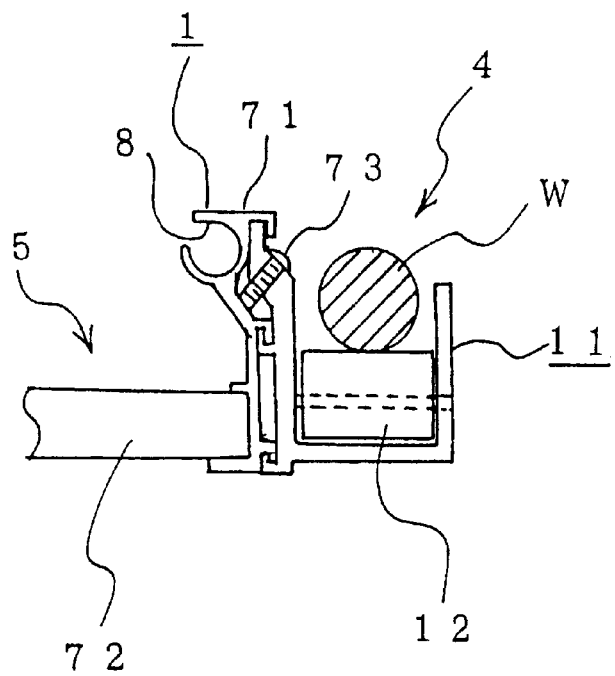
FIG. 61 is a partial front view of the cable bed of FIG. 60.

FIG. 61 is a partial sectional view, showing a state where a cable W is laid on the roll devices 12.

Figure 62:
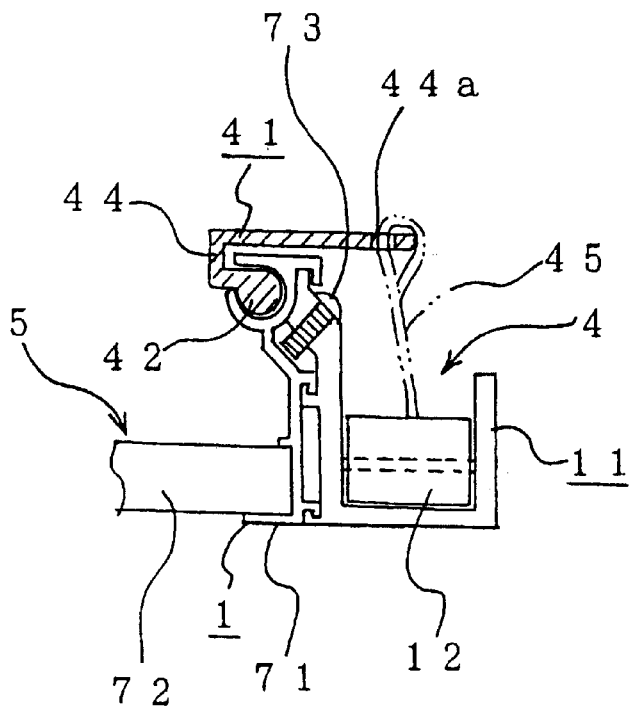
FIG. 62 is a front view showing a cable laying process utilizing the guide chute of the cable bed of FIG. 60 and a layer device.
Figure 63:
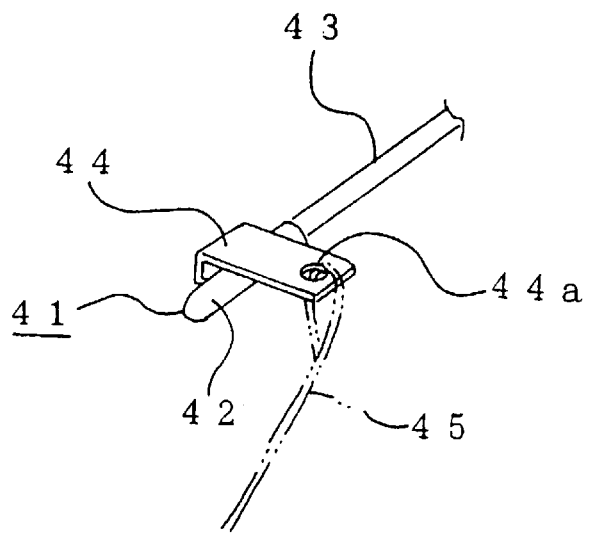
FIG. 63 is a perspective view showing the layer device of FIG. 62.

FIG. 62 shows how the guide chute 8 is utilized. A layer device 41 to be used for the guide chute 8 comprises a plate body 44 having a connection hole 44a and a cylindrical head portion 42 as shown in FIG. 63. A semi-rigid but flexible tail wire 43 is attached to the tail of the head portion 42. The plate body 44 extends over the drag route 4, where a drag rope 45 is tied to the connection hole 44a. The cylindrical head portion 42 is inserted into the guide chute 8 from an end opening of the guide chute 8 and travels through the guide chute 8 as pushed forward by means of the tail wire 43. The drag rope 45 is tied to a cable W before or after the tail wire 43 is laid through the guide chute 8.

Figure 64:
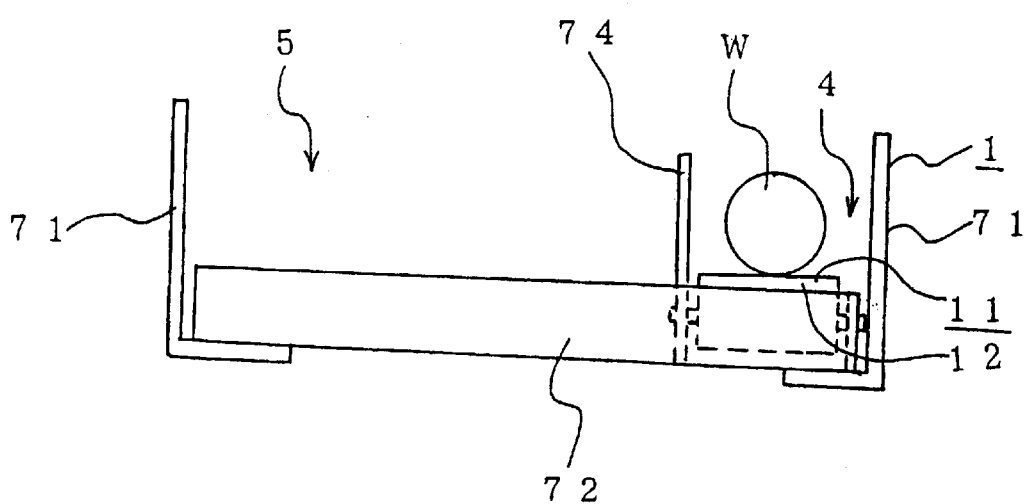
FIG. 64 is a front view of another ladder-type cable bed according to an embodiment of the present invention.
Figure 65:
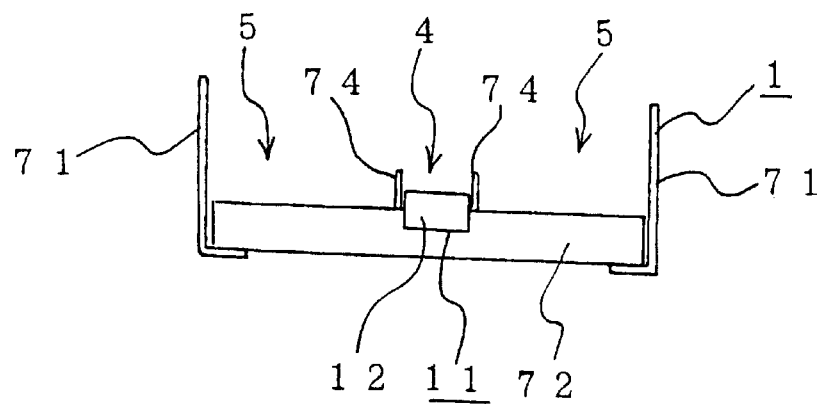
FIG. 65 is a front view of a variation of the cable bed of FIG. 64.
Figure 66:
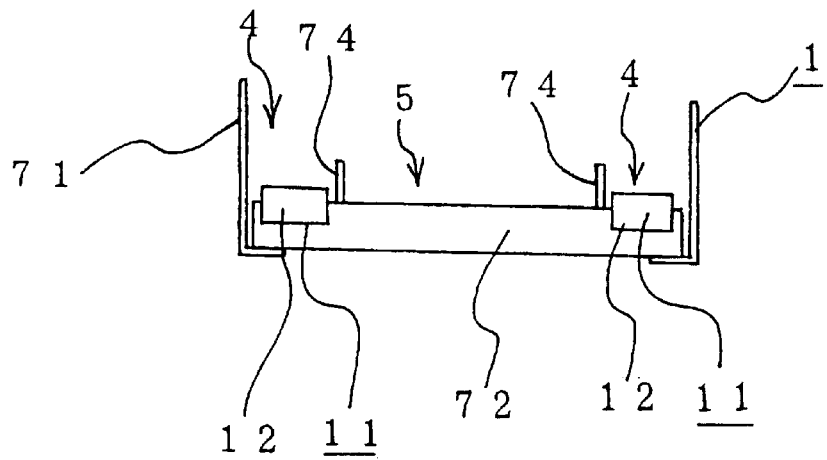
FIG. 66 is a front view of another variation of the cable bed of FIG. 64.

The ladder cable beds 1 shown in FIGS. 64, 65 and 66 are variations of the cable bed 1 shown in FIG. 60.

Figure 67:
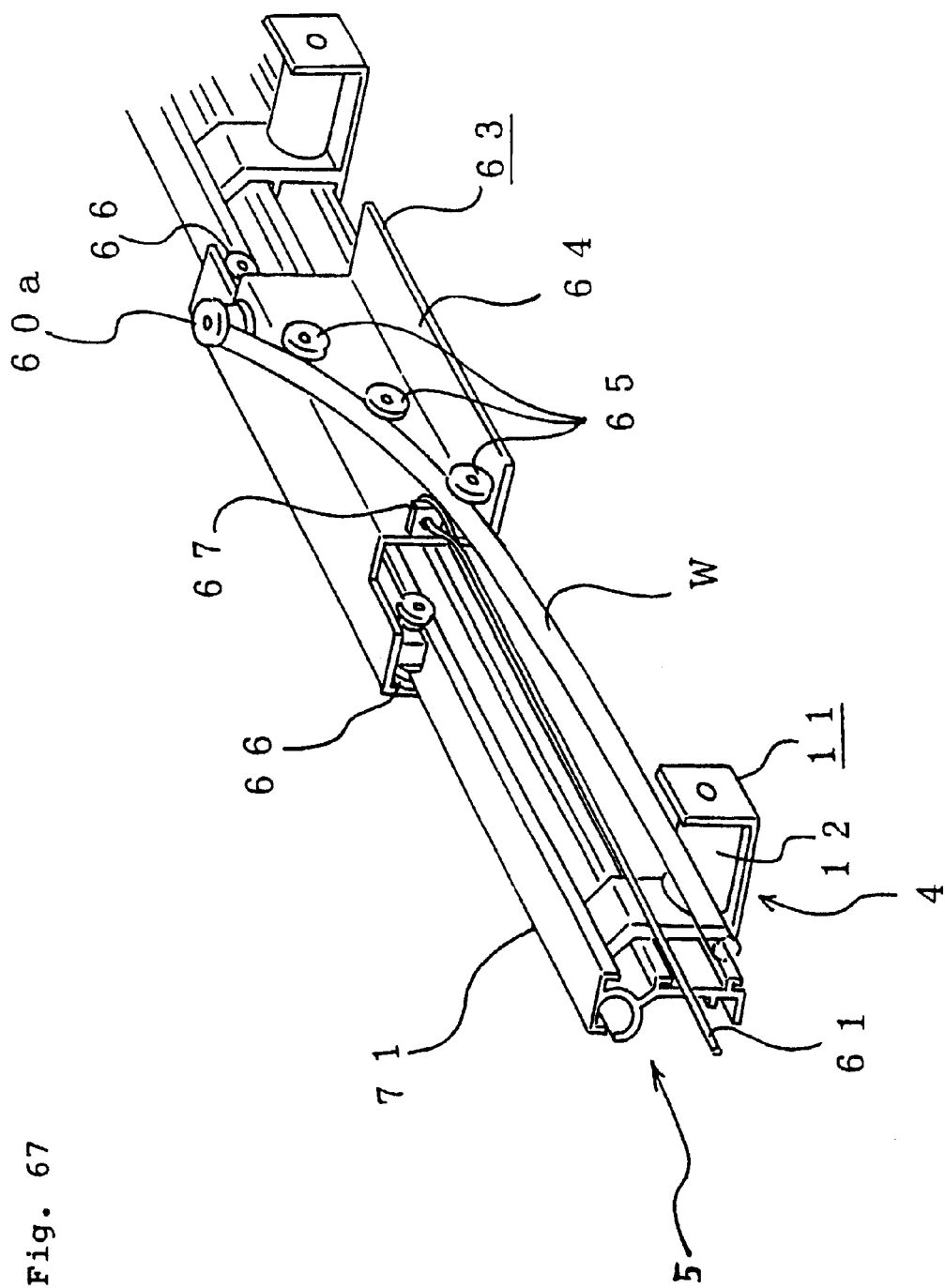
FIG. 67 is a perspective view of a cable shifting cart of the present invention to be used to shift a cable laid on the cable drag route onto the cable housing of the cable bed of FIG. 60.

FIG. 67 shows a process to shift a cable W lying on the drag route 4 provided outside of a side wall onto a cable housing 5 provided inside the ladder cable bed 1.

Figure 68:
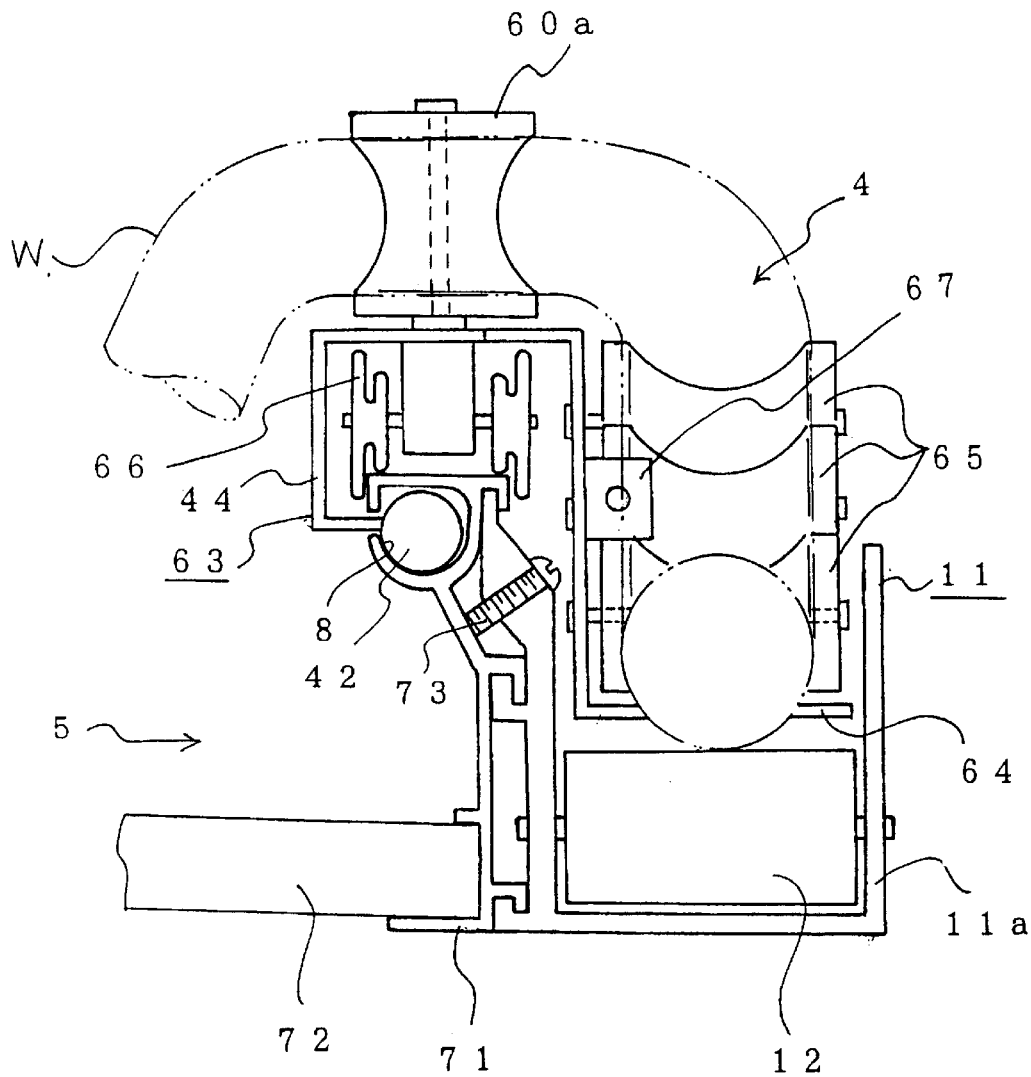
FIG. 68 is a front view showing the cable shifting cart of FIG. 67.

A wheeled cable shifting device or shifter 63 such as shown in FIGS. 67 and 68 is used to shift the cable W from the drag route 4 to the cable housing 5. The cable shifter 63 comprises a head portion 42 having a tail wire (not shown) to be inserted and travel in the guide chute 8, a plate body 44 bent at a plurality of places so as to clear the side wall of the cable bed 1, a wheel 60a provided on the top surface of the plate body 44 to bend and shift the cable W, carrier wheels 65 provided on the vertical surface of the plate body 44 to gradually lead the cable W to the wheel 60a, guide wheels 66 to travel on the rail 71, an attachment plate 67 to tie a drag rope 61 and a guide plate 64 extending sideways. The drag rope 61 is connected to the attachment plate 67 when the cable shifter 63 reaches the other end or a desired point of the cable bed 1 by means of pushing its semi-rigid tail (not shown) by hand. A portion of the cable W is placed appropriately on the cable shifter 63, then.

As the cable shifter 63 travels on the rail 71 pulled by means of the drag rope 61, a cable W laid on the drag route 4 is guided onto the cable housing 5 via the wheels 65 and 60a as will be readily understood by an ordinary artisan belonging in this technical field.

A self-propelled cart such as one disclosed in Japanese Patent Laid-Open Publication No. 8-280114 may be utilized to that at least the operation of drawing a drag rope 61 in the drag route 4 may be eliminated.

The present invention having been described in detail using various embodiments, such embodiments can be modified in various ways within the scope of the invention. The true scope of the invention is given by the appended claims.

What is claimed is:

1. A cable laying method for laying cable/pipe on a cable bed comprising at least one cable drag route and at least one cable housing, said method comprising the steps:

dragging a cable/pipe onto said at least one cable drag route with drag means; and shifting the cable/pipe onto said at least one cable housing with cable shifting means, wherein said step of dragging a cable/pipe comprises dragging a cable drag rope with said drag means.

2. The cable laying method according to claim 1, wherein said at least one drag route is provided with cable drag force reducing means.

3. The cable laying method according to claim 2, wherein said cable drag force reducing means comprises roll means.

4. The cable laying method according to claim 1, wherein said drag means is a layer device comprising a head portion and a semi-rigid elongated tail.

5. The cable laying method according to claim 1, wherein said drag means comprises a plurality of rod devices which are connected head and tail.

6. The cable laying method according to claim 1, said cable bed further comprising a drag chute.

7. The cable laying method according to claim 1, wherein said cable drag route is provided with a plurality of drag route formers.

8. The cable laying method according to claim 1, wherein said cable shifting means is a cable shifter.

9. The cable laying method according to claim 1, wherein said cable shifting means comprises a cable shifting cart.

10. The cable laying method according to claim 1, said cable bed further comprising guide rail means.

11. The cable laying method according to claim 4, said cable bed further comprising a guide chute.

12. The cable laying method according to claim 5, said cable bed further comprising a guide chute.

13. The cable laying method according to claim 4, wherein said cable drag route is provided with a plurality of drag route formers.

14. The cable laying method according to claim 5, wherein said cable drag route is provided with a plurality of drag route formers.

15. The cable laying method according to claim 2, wherein said drag means comprises a drag cart.

16. The cable laying method according to claim 3, wherein said drag means comprises a drag cart.

17. The cable laying method according to claim 2, wherein said cable shifting means is a cable shifter.

18. The cable laying method according to claim 3, wherein said cable shifting means is a cable shifter.

19. The cable laying method according to claim 2, wherein said cable shifting means comprises a cable shifting cart.

20. The cable laying method according to claim 3, wherein said cable shifting means comprises a cable shifting cart.

21. The cable laying method according to claim 9, said cable bed further comprising guide rail means.

* * * * *